(12) United States Patent
Yamada

(10) Patent No.: US 7,912,597 B2
(45) Date of Patent: Mar. 22, 2011

(54) ON-VEHICLE NETWORK DIAGNOSIS SYSTEM AND ON-VEHICLE CONTROL APPARATUS THEREOF

(75) Inventor: Mitsuo Yamada, Kariya (JP)

(73) Assignee: Denso Corporation, Kariya, Aichi-Pref. (JP)

( * ) Notice: Subject to any disclaimer, the term of this patent is extended or adjusted under 35 U.S.C. 154(b) by 1088 days.

(21) Appl. No.: 11/543,166

(22) Filed: Oct. 5, 2006

(65) Prior Publication Data

US 2007/0083304 A1    Apr. 12, 2007

(30) Foreign Application Priority Data

Oct. 6, 2005   (JP) ................... 2005-293425

(51) Int. Cl.
G01M 17/00   (2006.01)
G06F 7/00   (2006.01)
G06F 19/00   (2006.01)

(52) U.S. Cl. .......................... 701/29; 701/33
(58) Field of Classification Search ............ 701/29, 701/33
See application file for complete search history.

(56) References Cited

U.S. PATENT DOCUMENTS

| | | | |
|---|---|---|---|
| 6,885,289 B1 | 4/2005 | Nakai | |
| 2002/0065064 A1* | 5/2002 | Griffith et al. | 455/405 |
| 2002/0150050 A1* | 10/2002 | Nathanson | 370/241 |
| 2003/0060953 A1 | 3/2003 | Chen | |
| 2005/0171721 A1* | 8/2005 | Patterson et al. | 702/122 |
| 2005/0190619 A1* | 9/2005 | Wakiyama | 365/201 |
| 2005/0192716 A1* | 9/2005 | Ito et al. | 701/1 |

FOREIGN PATENT DOCUMENTS

| | | |
|---|---|---|
| EP | 0 474 907 A1 | 3/1992 |
| EP | 0474907 A1 * | 3/1992 |
| EP | 1 343 276 A1 | 9/2003 |
| JP | 08-033070 | 2/1996 |
| JP | 10-051475 | 2/1998 |
| JP | 10-154118 | 6/1998 |
| JP | 11-175331 | 7/1999 |
| JP | 11-316177 | 11/1999 |
| JP | 2001-202129 | 7/2001 |
| JP | U3087165 | 4/2002 |
| JP | 2004-276828 | 10/2004 |
| JP | 2005-044309 | 2/2005 |
| JP | 2005-088760 | 4/2005 |
| JP | 2005-204084 | 7/2005 |

OTHER PUBLICATIONS

European Examination Report dated Aug. 13, 2007 in Application No. 06019882.7.

(Continued)

*Primary Examiner* — Jack Keith
*Assistant Examiner* — Imran Mustafa
(74) *Attorney, Agent, or Firm* — Nixon & Vanderhye PC

(57) ABSTRACT

In an on-vehicle network diagnosis system, a master data storage stores master data, which includes reference connection information of a plurality of electronic control apparatuses with respect to an on-vehicle network. Current connection information of the plurality of electronic control apparatuses with respect to the on-vehicle network is obtained based on a response, which is transmitted from the plurality of electronic control apparatuses in reply to a response request. A validity of a connecting state of the plurality of electronic control apparatuses relative to the on-vehicle network is diagnosed by comparing the current connection information with the master data and thereby determining whether the current connection information matches with the master data.

3 Claims, 17 Drawing Sheets

OTHER PUBLICATIONS

Chinese Office Action dated Mar. 6, 2009, issued in corresponding Chinese Application No. 2006101415445, with English translation.

Japanese Office Action dated Oct. 12, 2010 issued in corresponding Japanese Application No. 2005-293425 with English Translation.

* cited by examiner

FIG. 3

| VEHICLE IDENTIFI-CATION CODE | CONNECTION INFORMATION | | STORAGE LOCATIONS OF VERIFICATION ERROR INFORMATION |
|---|---|---|---|
| 0123⋯EFG | FIRST GATEWAY CONTROL APPARATUS (ID:500) | | SECOND GATEWAY CONTROL APPARATUS<br>COMMUNICATION CONTROL APPARATUS ETC. |
| | | ENGINE CONTROL APPARATUS (ID:501) | TRANSMISSION CONTROL APPARATUS<br>CRUISE CONTROL APPARATUS ETC. |
| | | TRANSMISSION CONTROL APPARATUS (ID:502) | ENGINE CONTROL APPARATUS<br>CRUISE CONTROL APPARATUS ETC. |
| | | VEHICLE STABILITY CONTROL APPARATUS (ID:503) | ENGINE CONTROL APPARATUS<br>TRANSMISSION CONTROL APPARATUS ETC. |
| | | CRUISE CONTROL APPARATUS (ID:504) | ENGINE CONTROL APPARATUS<br>TRANSMISSION CONTROL APPARATUS ETC. |
| | SECOND GATEWAY CONTROL APPARATUS (ID:600) | | FIRST GATEWAY CONTROL APPARATUS<br>COMMUNICATION CONTROL APPARATUS ETC. |
| | | OPTIONAL CONTROL APPARATUS (ID:601) | SECOND GATEWAY CONTROL APPARATUS ETC. |
| | COMMUNICATION CONTROL APPARATUS (ID:700) | | FIRST GATEWAY CONTROL APPARATUS<br>SECOND GATEWAY CONTROL APPARATUS ETC. |
| | NAVIGATION CONTROL APPARATUS (ID:800) | | COMMUNICATION CONTROL APPARATUS<br>FIRST GATEWAY CONTROL APPARATUS ETC. |
| | ⋮ | | |

| ID | 500 | 501 | 502 | 503 | 504 |
|---|---|---|---|---|---|
| RESULT | 1 | 0 | 1 | 1 | 1 |

| ID | 500 | 501 | 502 | 503 | 504 | 600 | 601 |
|---|---|---|---|---|---|---|---|
| RESULT | 1 | 0 | 1 | 1 | 1 | 1 | 1 |

| ID | 500 | 501 | 502 | 503 | 504 | 600 | 601 | 800 | ... |
|---|---|---|---|---|---|---|---|---|---|
| RESULT | 1 | 0 | 1 | 1 | 1 | 1 | 1 | 1 | ... |

| ID | 500 | 501 | 502 | 503 | 504 | 600 | 601 | 800 | ... |
|---|---|---|---|---|---|---|---|---|---|
| RESULT | 0 | 0 | 0 | 0 | 0 | 0 | 0 | 0 | ... |

| ID | 500 | 501 | 502 | 503 | 504 | 600 | 601 | 800 | ... |
|---|---|---|---|---|---|---|---|---|---|
| RESULT | 1 | 0 | 0 | 0 | 1 | 1 | 0 | 0 | ... |

| ID | 500 | 501 | 502 | 503 | 504 | 600 | 601 | 800 | ... |
|---|---|---|---|---|---|---|---|---|---|
| RESULT | 1 | 0 | 1 | 0 | 1 | 1 | 1 | 0 | ... |

| ID | 500 | 501 | 502 | 503 | 504 | 600 | 601 | 800 | ... |
|---|---|---|---|---|---|---|---|---|---|
| RESULT | 1 | 0 | 1 | 1 | 1 | 1 | 1 | 1 | ... |

ON-VEHICLE NETWORK DIAGNOSIS SYSTEM AND ON-VEHICLE CONTROL APPARATUS THEREOF

CROSS REFERENCE TO RELATED APPLICATION

This application is based on and incorporates herein by reference Japanese Patent Application No. 2005-293425 filed on Oct. 6, 2005.

BACKGROUND OF THE INVENTION

1. Field of the Invention

The present invention relates to an on-vehicle network diagnosis system, which diagnoses a validity of a connecting state of a plurality of electronic control apparatuses interconnected through an on-vehicle network, and also relates to an on-vehicle control apparatus used in such a diagnosis system.

2. Description of Related Art

In one known distributed control system, such as one recited in Japanese Unexamined Patent Publication No. 11-175331, various on-vehicle devices are controlled based on information, which is distributed among a plurality of electronic control apparatuses that are interconnected through an on-vehicle network to allow intercommunication therebetween.

Specifically, the control system recited in Japanese Unexamined Patent Publication No. 11-175331 includes various electronic control apparatuses, such as an engine control apparatus, a brake control apparatus and a traction control apparatus. The engine control apparatus controls, for example, fuel injection of an internal combustion engine of a vehicle. The brake control apparatus performs the brake control of the vehicle. The traction control apparatus performs the traction control of the vehicle. Furthermore, in the traction control apparatus, a slip ratio SP, which indicates a possibility of slipping of a drive wheel(s) of the vehicle, is computed based on, for example, a vehicle speed and a rotational speed of the drive wheel. Then, the thus computed slip ratio is outputted to the communication bus. The slip ratio SP, which is outputted to the communication bus, is fed into the engine control apparatus and the brake control apparatus. In the engine control apparatus, the slip ratio SP is used in the engine control. Furthermore, in the brake control apparatus, the slip ratio SP is used in the brake control of the vehicle. As described above, in the control system recited in Japanese Unexamined Patent Publication No. 11-175331, the electronic control apparatuses share the information to perform the various control operations in cooperation.

In the vehicular control systems, which include the above system recited in Japanese Unexamined Patent Publication No. 11-175331, the electronic control apparatuses, which are connected to the on-vehicle network, send and receive the information relative to the other electronic control apparatuses to perform the above distributed control. In order to perform the distributed control safely, each electronic control apparatus monitors the validity of the connecting state (a communication state) between itself and the other corresponding electronic control apparatus. For example, in the case of the traction control apparatus, the traction control apparatus periodically transmits and receives information relative to the engine control apparatus and the brake control apparatus. Here, if the information is not received from these control apparatuses within a predetermined time period, the traction control apparatus determines that an abnormality (e.g., a communication bus abnormality, an electronic control apparatus abnormality) exists in the connection with these control apparatuses. Therefore, the above distributed control is stopped, and an appropriate fail-safe measure is taken.

As described above, in the on-vehicle network diagnosis system, which uses the above previously proposed control system, the distributed control described above is performed upon confirming the validity of the connecting state of the respective electronic control apparatuses. Therefore, the safety and the reliability of distributed control can be effectively maintained. However, types of on-vehicle electronic control apparatuses may vary from one vehicle to another vehicle even if these vehicles are of the same model due to differences in the specifications of the vehicles caused by, for example, climatizing of the vehicles or installation of optional equipments in the vehicles. Therefore, it is difficult to accurately diagnose the validity of the connecting states of the respective electronic control apparatuses in the on-vehicle network in view of information of types of electronic control apparatuses preinstalled at the time of sale of the subject vehicle and also in view of information of a type of any additional electronic control apparatus installed after the sale of the subject vehicle due to installation of an optional equipment.

Furthermore, as recited in Japanese Unexamined Patent Publication No. 11-316177, another system is known. In this system, in order to check the communicating state of respective electronic control apparatuses connected to an on-vehicle network, identification information of each corresponding electronic control apparatus, which is in the communicating state, is compared with a verification database to perform the above diagnosis. However, this verification database may be an on-board ratio database, which indicates the information of an on-board ratio of each corresponding electronic control apparatus, or may be a combination database, which indicates the information of a set of possible electronic control apparatuses that will be probably installed in the vehicle. Therefore, a sufficient accuracy in the diagnosis of the validity of the connecting state of the respective electronic control apparatuses cannot be guaranteed. Specifically, in the case of the on-board ratio database, it is required to summarize the statistical results, and thereby it is tedious and time consuming to use the on-board ratio database. Also, the result of the diagnosis is merely the prediction. Furthermore, in the case of the combination database, the diagnosis can be made only for the set of electronic control apparatuses, so that the other electronic control apparatuses other than the set of electronic control apparatuses cannot be appropriately diagnosed with respect to its connecting state based on the combination database.

SUMMARY OF THE INVENTION

The present invention is made in view of the above disadvantages. Thus, it is an objective of the present invention to provide an on-vehicle network diagnosis system, which can more accurately diagnose a validity of a connecting state of respective electronic control apparatuses connected to an on-vehicle network that forms a distributed control system. It is another objective of the present invention to provide an on-vehicle control apparatus used in such an on-vehicle diagnosis system.

To achieve the objectives of the present invention, there is provided an on-vehicle network diagnosis system for an on-vehicle network, which interconnects a plurality of electronic control apparatuses and forms a distributed control system of a vehicle. The on-vehicle network diagnosis system includes a master data storage means, a connection information obtaining means and a diagnosing means. The master data storage means is for storing master data, which includes reference connection information of the plurality of electronic control apparatuses with respect to the on-vehicle network. The connection information obtaining means is for obtaining current connection information of the plurality of electronic control apparatuses with respect to the on-vehicle network based on a response, which is transmitted from the plurality of electronic control apparatuses in reply to a response request outputted from the connection information obtaining means to the plurality of electronic control apparatuses. The diagnosing means is for diagnosing a validity of a connecting state of the plurality of electronic control apparatuses relative to the on-vehicle network by comparing the current connection information with the master data and thereby determining whether the current connection information matches with the master data.

To achieve the objectives of the present invention, there is also provided an on-vehicle control apparatus for an on-vehicle network, which interconnects a plurality of electronic control apparatuses and forms a distributed control system of a vehicle. The on-vehicle control apparatus includes a master data storage means, a connection information obtaining means and a diagnosing means. The master data storage means is for storing master data, which includes reference connection information of the plurality of electronic control apparatuses with respect to the on-vehicle network. The connection information obtaining means is for obtaining current connection information of the plurality of electronic control apparatuses with respect to the on-vehicle network based on a response, which is transmitted from the plurality of electronic control apparatuses in reply to a response request outputted from the connection information obtaining means to the plurality of electronic control apparatuses. The diagnosing means is for diagnosing a validity of a connecting state of the plurality of electronic control apparatuses relative to the on-vehicle network by comparing the current connection information with the master data and thereby determining whether the current connection information matches with the master data.

To achieve the objective of the present invention, there is also provided an on-vehicle control apparatus that communicates with a remote control center and is connected to an on-vehicle network, to which a plurality of electronic control apparatuses is connected and which performs distributed control of a plurality of on-vehicle devices. The on-vehicle control apparatus includes a communicating means and a connection information obtaining means. The communicating means is for communicating information with the control center through radio communication. The connection information obtaining means is for obtaining current connection information of the plurality of electronic control apparatuses with respect to the on-vehicle network based on a response, which is transmitted from the plurality of electronic control apparatuses in reply to a response request outputted from the connection information obtaining means to the plurality of electronic control apparatuses. The communicating means transmits the current connection information to the control center and thereby requests diagnosing of a validity of a connecting state of the plurality of electronic control apparatuses relative to the on-vehicle network at the control center. The control center includes a master data storage means and a diagnosing means. The master data storage means is for storing master data, which includes reference connection information of the plurality of electronic control apparatuses with respect to the on-vehicle network. The diagnosing means is for diagnosing the validity of the connecting state of the plurality of electronic control apparatuses relative to the on-vehicle network by comparing the current connection information with the master data and thereby determining whether the current connection information matches with the master data.

To achieve the objectives of the present invention, there is also provided an on-vehicle control apparatus that communicates with a remote control center and is connected to an on-vehicle network, to which a plurality of electronic control apparatuses is connected and which performs distributed control of a plurality of on-vehicle devices. The on-vehicle control apparatus includes a communicating means, a master data storage means and a connection information obtaining means. The communicating means is for communicating information with the control center through radio communication. The master data storage means is for storing master data, which includes reference connection information of the plurality of electronic control apparatuses with respect to the on-vehicle network. The connection information obtaining means is for obtaining current connection information of the plurality of electronic control apparatuses with respect to the on-vehicle network based on a response, which is transmitted from the plurality of electronic control apparatuses in reply to a response request outputted from the connection information obtaining means to the plurality of electronic control apparatuses. The communicating means transmits the current connection information and the master data to the control center and thereby requests diagnosing of a validity of a connecting state of the plurality of electronic control apparatuses relative to the on-vehicle network at the control center. The control center includes a diagnosing means for diagnosing the validity of the connecting state of the plurality of electronic control apparatuses relative to the on-vehicle network by comparing the current connection information with the master data and thereby determining whether the current connection information matches with the master data.

To achieve the objectives of the present invention, there is also provided an on-vehicle control apparatus that communicates with a remote control center and is connected to an on-vehicle network, to which a plurality of electronic control apparatuses is connected and which performs distributed control of a plurality of on-vehicle devices. The on-vehicle control apparatus includes a communicating means, a connection information obtaining means and a diagnosing means. The communicating means is for communicating information with the control center through radio communication. The connection information obtaining means is for obtaining current connection information of the plurality of electronic control apparatuses with respect to the on-vehicle network based on a response, which is transmitted from the plurality of electronic control apparatuses in reply to a response request outputted from the connection information obtaining means to the plurality of electronic control apparatuses. The diagnosing means is for diagnosing a validity of a connecting state of the plurality of electronic control apparatuses relative to the on-vehicle network by comparing the current connection information with master data, which includes reference connection information of the plurality of electronic control apparatuses with respect to the on-vehicle network, and thereby determining whether the current connection information matches with the master data. The control center includes a master data storage means for storing the master data. The communicating means receives the master data from the control center and provides the received master data to the diagnosing means, so that the diagnosing means executes the diagnosing of the validity of the connecting state of the plurality of electronic control apparatuses relative to the on-vehicle network by comparing the current connection information with the received master data.

To achieve the objectives of the present invention, there is also provided an on-vehicle control apparatus that communicates with a remote control center and is connected to an on-vehicle network, to which a plurality of electronic control apparatuses is connected and which performs distributed control of a plurality of on-vehicle devices. The on-vehicle control apparatus includes a communicating means, a connection information obtaining means and a vehicle-side diagnosing means. The communicating means is for communicating information with the control center through radio communication. The connection information obtaining means is for obtaining current connection information of the plurality of electronic control apparatuses with respect to the on-vehicle network based on a response, which is transmitted from the plurality of electronic control apparatuses in reply to a response request outputted from the connection information obtaining means to the plurality of electronic control apparatuses. The vehicle-side diagnosing means is for diagnosing the plurality of electronic control apparatuses in view of the current connection information. At least one of the on-vehicle control apparatus and the control center includes a master data storage means for storing master data, which includes reference connection information of the plurality of electronic control apparatuses with respect to the on-vehicle network. The control center includes a control center-side diagnosing means for diagnosing the plurality of electronic control apparatuses in view of the current connection information. One of the vehicle-side diagnosing means and the control center-side diagnosing means sends a diagnosis request to the other one of the vehicle-side diagnosing means and the control center-side diagnosing means to command execution of diagnosing of a validity of a connecting state of the plurality of electronic control apparatuses relative to the on-vehicle network by comparing the current connection information with the master data and thereby determining whether the current connection information matches with the master data.

To achieve the objectives of the present invention, there is also provided an on-vehicle control apparatus that communicates with a remote control center and is connected to an on-vehicle network, to which a plurality of electronic control apparatuses is connected and which performs distributed control of a plurality of on-vehicle devices. The on-vehicle control apparatus includes a communicating means, a connection information obtaining means and a vehicle-side diagnosing means. The communicating means is for communicating information with the control center through radio communication. The connection information obtaining means is for obtaining current connection information of the plurality of electronic control apparatuses with respect to the on-vehicle network based on a response, which is transmitted from the plurality of electronic control apparatuses in reply to a response request outputted from the connection information obtaining means to the plurality of electronic control apparatuses. The vehicle-side diagnosing means is for diagnosing the plurality of electronic control apparatuses in view of the current connection information. At least one of the on-vehicle control apparatus and the control center includes a master data storage means for storing master data, which includes reference connection information of the plurality of electronic control apparatuses with respect to the on-vehicle network. The control center includes a control center-side diagnosing means for diagnosing the plurality of electronic control apparatuses in view of the current connection information. The vehicle-side diagnosing means and the control center-side diagnosing means diagnose a validity of a connecting state of the plurality of electronic control apparatuses relative to the on-vehicle network by comparing the current connection information with the master data and thereby determining whether the current connection information matches with the master data in such a manner that the vehicle-side diagnosing means and the control center-side diagnosing means communicate information required in the diagnosing of the validity of the connecting state of the plurality of electronic control apparatuses through radio communication therebetween and share a work load of the diagnosing of the validity of the connecting state of the plurality of electronic control apparatuses therebetween.

To achieve the objectives of the present invention, there is also provided an on-vehicle control apparatus that communicates with a remote control center and is connected to an on-vehicle network, to which a plurality of electronic control apparatuses is connected and which performs distributed control of a plurality of on-vehicle devices. The communicating means is for communicating information with the control center through radio communication. The master data storage means is for storing master data, which includes reference connection information of the plurality of electronic control apparatuses with respect to the on-vehicle network. The connection information obtaining means is for obtaining current connection information of the plurality of electronic control apparatuses with respect to the on-vehicle network based on a response, which is transmitted from the plurality of electronic control apparatuses in reply to a response request outputted from the connection information obtaining means to the plurality of electronic control apparatuses. The diagnosing means is for diagnosing a validity of a connecting state of the plurality of electronic control apparatuses relative to the on-vehicle network by comparing the current connection information with the master data and thereby determining whether the current connection information matches with the master data, wherein a result of the diagnosing, which is performed by the diagnosing means, is transmitted to the control center through the communicating means.

BRIEF DESCRIPTION OF THE DRAWINGS

The invention, together with additional objectives, features and advantages thereof, will be best understood from the following description, the appended claims and the accompanying drawings in which:

FIG. 3 is a diagram showing a structure of master data stored in a master data storage (a master data storage means);

DETAILED DESCRIPTION OF THE INVENTION

First Embodiment

An on-vehicle network diagnosis system and an on-vehicle control apparatus used therein according to a first embodiment of the present invention will be described with reference to FIGS. 1-17. The on-vehicle network diagnosis system diagnoses a validity of a connecting state of respective electronic control apparatuses interconnected in a communicatable manner through an on-vehicle network to execute distributed control of various on-vehicle devices. In the on-vehicle network diagnosis system of the present embodiment, the validity of the connecting state of the respective electronic control apparatuses in the distributed control system of each of subject vehicles with respect to the on-vehicle network is diagnosed. The result of the diagnosis of each vehicle is integrally managed in an external remote control center, which is remote from the vehicle. This integrally managed information (the result of the diagnosis) may be effectively used in the following situations.

(I) When any one of the vehicles has an abnormality in the connection of the electronic control apparatuses to the on-vehicle network, the external control center may notify a user (a driver) of this particular vehicle that the connection abnormality exists in the connection to the on-vehicle network.

(II) The occurrence of the connection abnormality to the on-vehicle network may be statistically analyzed for each corresponding vehicle model or for each corresponding manufacturing lot, and the result of the statistical analysis may be used in the vehicle development (e.g., development of a safely measure).

Here, the above information may be particularly used in vehicle maintenance services.

Figure 1:
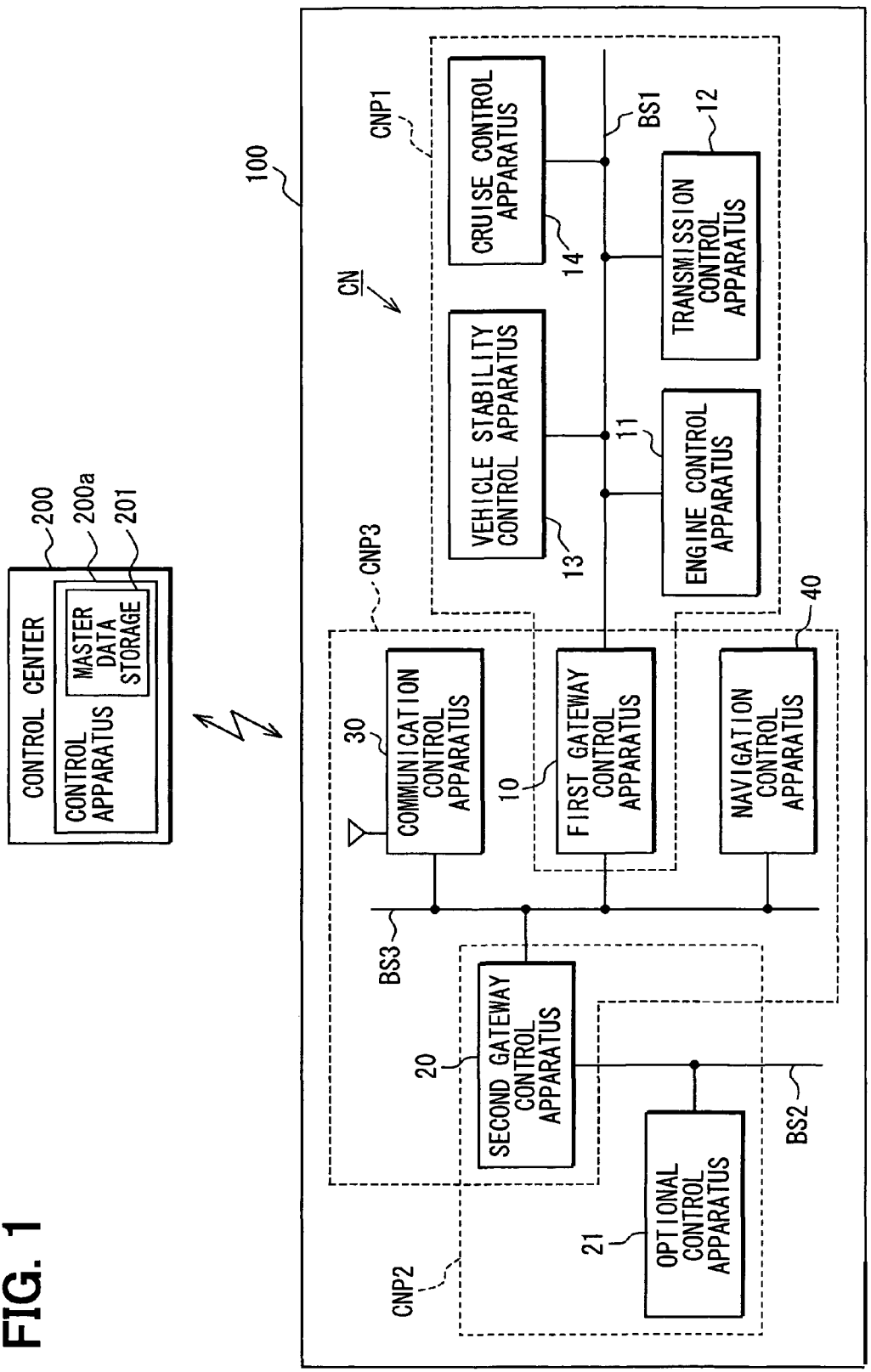
FIG. 1 is a block diagram showing a structure of an on-vehicle network diagnosis system according to a first embodiment of the present invention.

FIG. 1 is a block diagram of the on-vehicle network diagnosis system, which includes the respective vehicles (only one is shown) 100 and the external control center 200 (more specifically, a control apparatus or computer apparatus 200a of the control center 200). The external control center 200 exchanges information relative to the multiple vehicles (only one is shown) 100, each of which is a subject for the diagnosis. Here, it should be noted that in the following description, the words "control center 200" may be used to refer the control apparatus 200a of the control center 200 for the sake of simplicity.

First, with reference to FIG. 1, the on-vehicle network CN of the vehicle 100, which is a subject for the above diagnosis, will be described. As shown in FIG. 1, the on-vehicle network CN according to the present embodiment includes a plurality (three in this instance) of network arrangements CNP1-CNP3, which use different communication protocols, respectively. These network arrangements CNP1-CNP3 are interconnected through gateways. The on-vehicle network CN is a bus type network system, such as a controller area network (CAN).

Here, the first network arrangement CNP1 includes five electronic control apparatuses 10-14 and a first communication bus BS1. These electronic control apparatuses 10-14 include a first gateway control apparatus 10, an engine control apparatus 11, a transmission control apparatus 12, a vehicle stability control apparatus 13 and a cruise control apparatus 14. The first communication bus BS1 electrically interconnects these electronic control apparatuses 10-14.

The first gateway control apparatus 10 mediates the communication between the network arrangement CNP1 and the network arrangement CNP3 by adjusting the differences between the communication protocol of the network arrangement CNP1 and the communication protocol of the network arrangement CNP3. The engine control apparatus 11 performs a control operation of, for example, fuel injection of an on-vehicle engine. The traction control apparatus 12 performs an automatic shift control operation of a gear ratio of a transmission of the vehicle. The vehicle stability control apparatus performs a control operation for maintaining a stability of the vehicle by limiting side slip of the vehicle. The cruise control apparatus 14 performs a control operation for driving the vehicle at a registered constant speed.

In the first network arrangement CNP1, the information, which is received through the gateway control apparatus 10, and a control state of and a control result of each of the electronic control apparatuses, which are connected to the network arrangement CNP1, are communicated through the first communication bus BS1. Based on the thus communicated information, the above control operations are performed in the above electronic control apparatuses 10-14. In this particular instance, the distributed control operation with respect to the driving of the vehicle is performed.

The second network arrangement CNP2 includes two electronic control apparatuses 20-21 and a second communication bus BS2. These electronic control apparatuses 20-21 include a second gateway control apparatus 20 and an optional control apparatus 21. The second communication bus BS2 electrically interconnects these electronic control apparatuses 20-21.

The second gateway control apparatus 20 mediates the communication between the network arrangement CNP2 and the network arrangement CNP3 by adjusting the differences between the communication protocol of the network arrangement CNP2 and the communication protocol of the network arrangement CNP3.

The optional control apparatus 21 is optionally installed in the vehicle to perform a corresponding control operation and thereby to implement an optional vehicle control function.

In the second network arrangement CNP2, the information, which is received through the gateway control apparatus 20, and a control state of and a control result of each of the electronic control apparatuses, which are connected to the network arrangement CNP2, are communicated through the second communication bus BS2. Based on the thus communicated information, the above control operations of the electronic control apparatuses 20, 21 are performed.

Furthermore, in addition to the gateway control apparatuses 10, 20, the third network arrangement CNP3 includes two additional electronic control apparatuses 30, 40 and the third communication bus BS3. These electronic control apparatuses 30, 40 include a communication control apparatus (a communicating means) 30 and a navigation control apparatus 40. The third communication bus BS3 electrically interconnects these electronic control apparatuses 10, 20, 30, 40. The communication control apparatus 30 exchanges information with the control center 200 through radio communication. The navigation control apparatus 40 forms a part of a navigation system.

Figure 2:
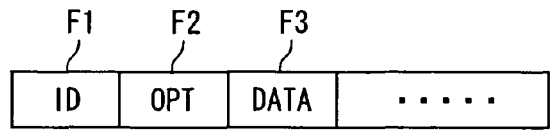
FIG. 2 is a diagram showing a structure of data transmitted between a control center and a communication control apparatus (an on-vehicle control apparatus)

In the third network arrangement CNP3, the information, which is received through the gateway control apparatus 10 or 20, and a control state of and a control result of each of the electronic control apparatuses, which are connected to the network arrangement CNP3, are communicated through the third communication bus BS3. Based on the thus communicated information, the above control operations of the electronic control apparatuses 10, 20, 30, 40 are performed. The exchange of the information between the communication control apparatus 30 and the control center 200 through the radio communication is performed by serial communication using a message, which includes fields F1-F3 in its data structure, as indicated in FIG. 2. The field F1 is used to indicate an identifier (ID) of the subject vehicle or of the subject electronic control apparatus, to which the message is addressed. The field F2 is used to indicate a type of a request (a command). The field F3 is used to store actual data.

In the on-vehicle network diagnosis system of the present embodiment, a master data storage (a master data storage means) 201 is provided. The master data storage 201 stores master data, which includes the connection information (reference connection information) of the electronic control apparatuses connected to the on-vehicle network CN. The master data is stored and is renewed at predetermined timing, such as at the time of assembling of the vehicle in a vehicle assembly line, at the time of sale of the vehicle in a dealer, at the time of installation of an additional optional function (or an additional device), at the time of repairing of the vehicle at a service station. At the time of diagnosing the validity of the connecting state of the corresponding electronic control apparatus relative to the on-vehicle network CN, the connection information (current connection information) of this particular electronic control apparatus, which is obtained through processing of a response request in the electronic control apparatus in the vehicle 100, is verified with the master data by comparing the connection information with the master data and thereby determining whether the connection information matches with the master data. Thus, when a connection abnormality occurs in the on-vehicle network CN, the corresponding electronic control apparatus, which has the invalid connecting state relative to the on-vehicle network CN, can be effectively identified to obtain a more accurate diagnosis result. Furthermore, the thus obtained more accurate diagnosis result can provide the following advantages.

(III) As the entire distributed control system of the vehicle 100, an appropriate fail-safe measure, which corresponds to the thus identified invalid electronic control apparatus having the invalid connecting state relative to the on-vehicle network CN, can be executed.

(IV) In a case where the control center 200 rewrites (reprograms) data (a program) in the respective electronic control apparatuses connected to the on-vehicle network CN, appropriate reprogramming can be performed on the identified invalid electronic control apparatus having the invalid connecting state relative to the on-vehicle network CN.

In this way, the degree of freedom with respect to the use of the diagnosis result is improved, so that an appropriate service can be implemented in a wider range.

In the present embodiment, as shown in FIG. 3, the data structure of the master data, which is the connection information of the electronic control apparatuses connected to the on-vehicle network CN, has the following features. The data structure includes a connection position of each corresponding electronic control apparatus, which is hierachized in a manner that corresponds to the network structure. In the data structure, the identifier of each corresponding electronic control apparatus connected to the on-vehicle network CN is registered in correlation with the vehicle identification code. The master data, which has the above data structure, is stored in the master data storage 201.

Furthermore, as shown in FIG. 3, at the time of performing the distributed control operation through the on-vehicle network CN, each communicating electronic control apparatus, which communicates the information with the identified invalid electronic control apparatus that is diagnosed as having the invalid connecting state, is registered in the master data as a storage location for storing the diagnosis information of the identified invalid electronic control apparatus. This is done for each registered electronic control apparatus, which is registered in the master data, along with its identifier. Thus, with the above master data, the following is possible. That is, when the connection abnormality to the on-vehicle network CN exists, the electronic control apparatus, which causes the connection abnormality and is therefore diagnosed as having the invalid connecting state, is identified. Then, the diagnosis information and the identifier of the identified invalid electronic control apparatus are stored in each corresponding communicating electronic control apparatus, which communicates the information with the identified invalid electronic control apparatus in the distributed control operation through the on-vehicle network CN. Specifically, in this case, the above diagnosis information can be appropriately stored only in each corresponding electronic control apparatus, which needs to shift its operation to the fail-safe mode, among the electronic control apparatuses of the vehicle 100. In this way, the appropriate fail-safe measure can be more effectively executed as the entire distributed control system of the vehicle.

In the present embodiment, the master data storage 201, which stores the above master data, is provided in the control center 200, as shown in FIG. 1. Specifically, in this instance, for example, in the case where the service described in the above section (IV) is performed, when the data stored in the electronic control apparatuses connected to the on-vehicle network CN needs to be rewritten, the control center 200 can easily determine whether the subject electronic control apparatuses, which have the data that need to be rewritten, are present in the vehicle 100. Thus, the service described in the above section (IV) can be appropriately provided. The master data storage 201 includes a memory, such as a hard disk.

In the on-vehicle network diagnosis system of the present embodiment, both of the vehicle 100 and the control center 200 can diagnose the validity of the connecting state of the electronic control apparatuses of the vehicle relative to the on-vehicle network CN based on the master data and the connection information obtained by the vehicle 100, thereby implementing the diagnosing means. As will be described in detail below, the work load of this diagnosis process may be shared between the communication control apparatus 30 and the control center 200, so that the processing capacity of the entire on-vehicle network diagnosis system can be effectively used to perform the above diagnosis process. According to the present embodiment, in the vehicle 100, the communication control apparatus 30 serves as the on-vehicle control apparatus, which can diagnose the validity of the connecting state of the respective electronic control apparatuses of the vehicle 100 to the on-vehicle network CN.

Next, the diagnosis process for diagnosing the validity of the connecting state of the respective electronic control apparatuses of the vehicle 100 relative to the on-vehicle network CN performed under the cooperation between the communication control apparatus 30 of the vehicle 100 and the control center 200 in the on-vehicle network diagnosis system will be described with reference to FIGS. 4 to 10. In the on-vehicle network diagnosis system, a corresponding one of the communication control apparatus 30 of the vehicle 100 and the control center 200, which executes a work load share determination process for determining a work load share of the communication control apparatus 30 and a work load share of the control center 200, will request execution of the corresponding part of the diagnosis process to the other one of the communication control apparatus 30 and the control center 200 based on a result of the work load share determination process.

First, with reference to FIGS. 4 to 10, the diagnosis process executed by the communication control apparatus 30 of the vehicle 100 will be described.

At the time of performing the diagnosis process in the vehicle 100, the communication control apparatus 30 performs a verification process (see FIG. 4) for verifying the connection information (the current connection information) obtained by the vehicle 100 side with the master data and also at the same time performs a flag manipulation process (see FIG. 5) for manipulating flags used in the verification process. These processes are repeated at predetermined intervals.

Figure 5:
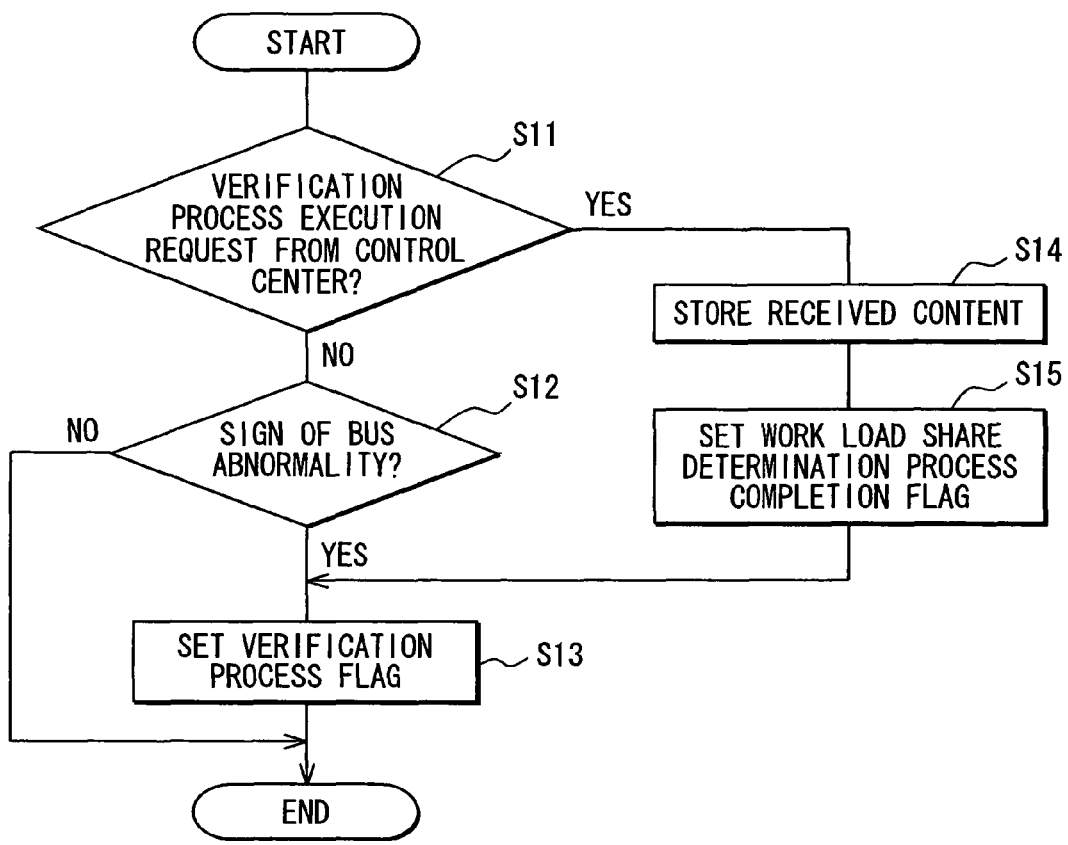
FIG. 5 is a flowchart showing a procedure for manipulating a verification process flag and a work load share determination process completion flag in the communication control apparatus (the on-vehicle control apparatus) of the vehicle.

At the time of executing the flag manipulation process, as shown in FIG. 5, the communication control apparatus 30 first determines whether a verification process execution request has been received from the control center 200 at step S11. When it is determined that the verification process execution request has not been received from the control center 200 at step S11, control proceeds to step S12. At step S12, it is determined whether a sign of the connection abnormality exists in the on-vehicle network CN. This determination is performed to determine whether the abnormality in the communication between the electronic control apparatuses through the on-vehicle network CN has been sensed. When it is determined that the sign of the connection abnormality exists in the on-vehicle network CN at step S12, control proceeds to step S13. At step S13, a verification process flag, which indicates a need for performing the verification process, is set, and the current control operation is terminated. The verification process flag is stored in, for example, a data memory of the communication control apparatus 30. At the time of executing the above diagnosis process, the verification of the connection information obtained at the vehicle 100 side with the master data is executed only when the verification process flag is set.

In contrast, when it is determined that the sign of the connection abnormality does not exit in the on-vehicle network CN at step S12, a reset state, i.e., a cleared state of the verification process flag is maintained, and the current control operation is terminated.

Also, when it is determined that the verification process execution request is received from the control center 200 at step S11, the verification process execution request flag is set at step S13. However, at this time, before proceeding to the manipulation of the verification process flag, control moves to step S14. At step S14, the content of the verification process execution request received from the control center 200 is stored in the data memory of the communication control apparatus 30. In this case, as described above, the work load share determination process for determining the work load share of the communication control apparatus 30 and the work load share of the control center 200 has been already performed in the control center 200. Thus, at step S15, a work load share determination process completion flag, which indicates that the above work load share determination process has been already completed, is set. Through the above processes, in the communication control apparatus 30 of the vehicle 100, the content of the verification process execution request stored in the data memory is executed, i.e., the connection information obtained in the vehicle 100 side is verified with the master data according to the work load share of the vehicle 100 side, which is determined at the control center 200 side.

Figure 4:
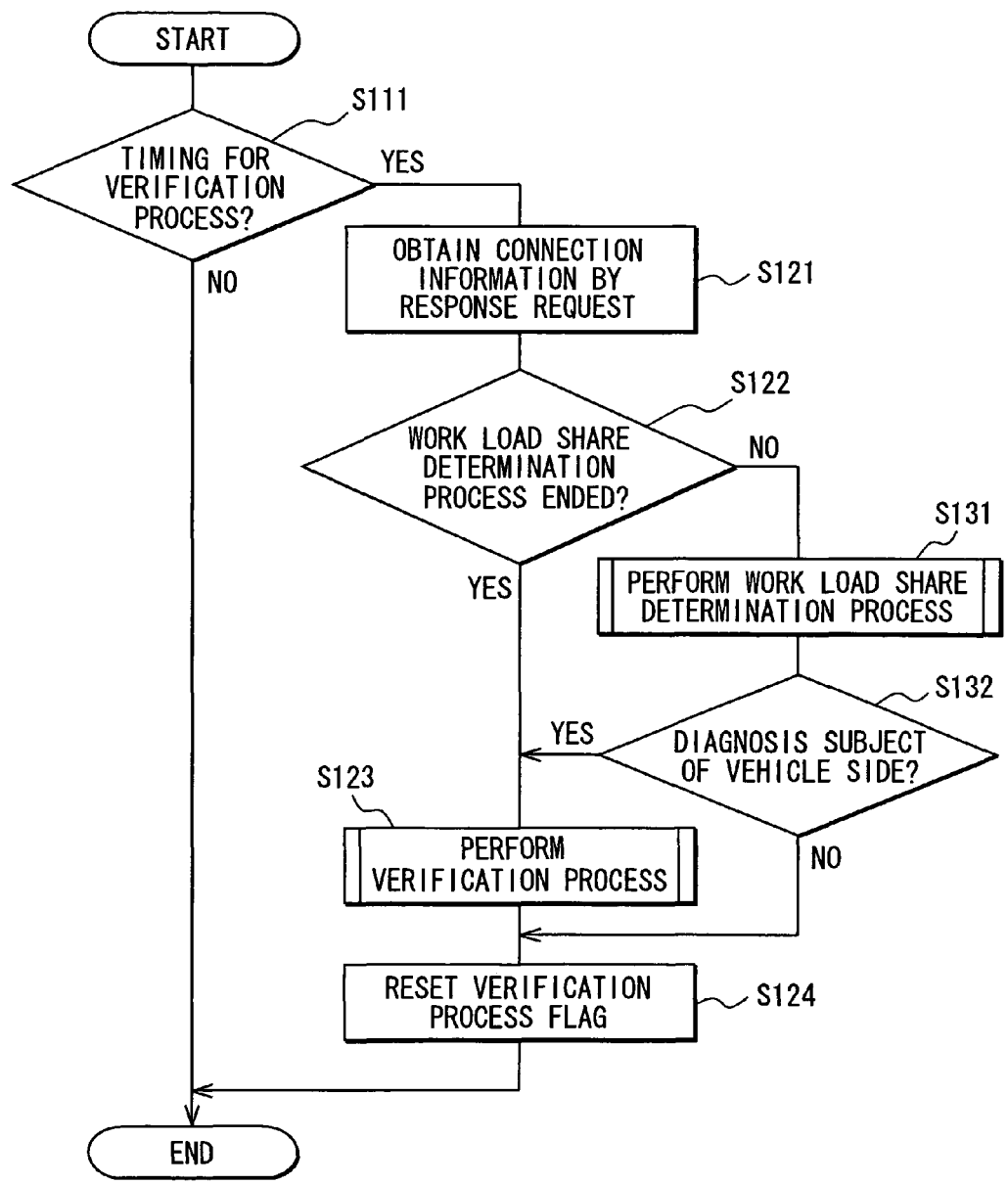
FIG. 4 is a flowchart showing a procedure for verifying connection information obtained at the vehicle side with the master data in the communication control apparatus (the on-vehicle control apparatus) of the vehicle.

Then, in the communication control apparatus 30 of the vehicle 100, as described above, the verification process for verifying the connection information obtained by the vehicle 100 side with the master data is performed according to the flowchart shown in FIG. 4 simultaneously with the above flag manipulation process (FIG. 5).

That is, as shown in FIG. 4, at step S111, the communication control apparatus 30 of the present embodiment will wait until the verification process flag is set. When it is determined that the verification process flag is set at step S111, it is then determined that the verification process needs to be performed, so that control proceeds to step S121. At step S121, the current connection information of the electronic control apparatuses relative to the on-vehicle network CN is obtained by a response request outputted to these electronic control apparatuses.

Figures 7A, 7B, 7C, 8:
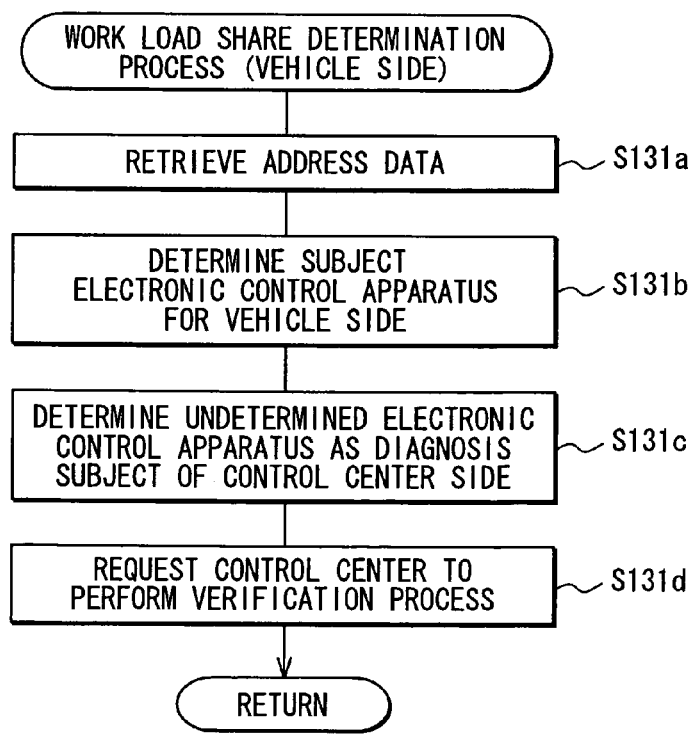
FIGS. 7A-7C are diagrams illustrating a way of obtaining information of electronic control apparatuses connected to an on-vehicle network in the communication control apparatus (the on-vehicle control apparatus) of the vehicle.
FIG. 8 is a flowchart showing a procedure for determining a work load share of the communication control apparatus (the on-vehicle control apparatus) and a work load share of the control center in the communication control apparatus (the on-vehicle control apparatus) of the vehicle.
Figure 9:
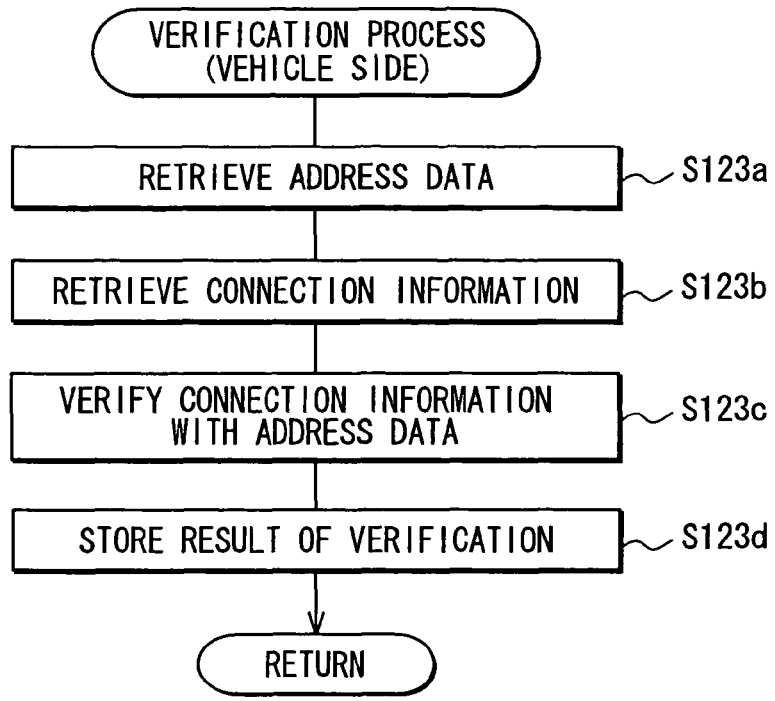
FIG. 9 is a flowchart showing the procedure for verifying the connection information obtained at the vehicle side with the master data in the communication control apparatus (the on-vehicle control apparatus) of the vehicle.
Figure 10:
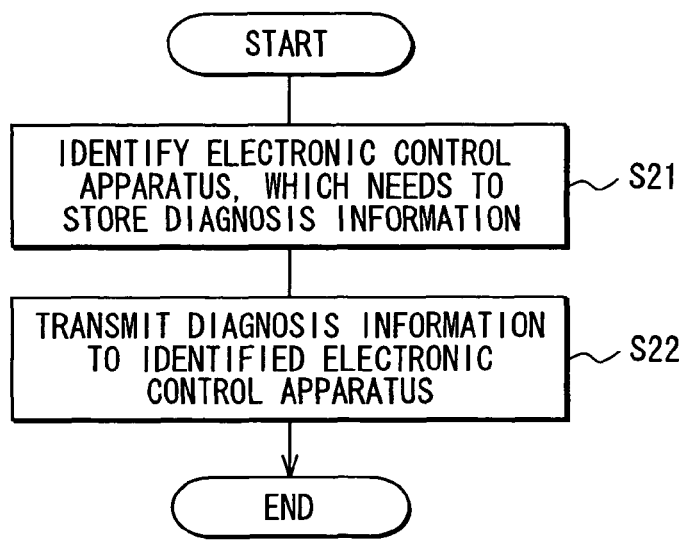
FIG. 10 is a flowchart showing a procedure for performing a fail-safe mode (a fail-safe measure), which is preset for an identified electronic control apparatus that has an invalid connecting state, in the communication control apparatus (the on-vehicle control apparatus) of the vehicle.

Now, the process of step S121 will be specifically described with reference to FIGS. 7A to 7C. FIGS. 7A to 7C indicate the data structure of the data memory of the communication control apparatus 30. In the data memory, each successful electronic control apparatus, from which the connection information is successfully obtained in response to the response request, will have "1" as a result of the response request associated with the corresponding identifier (ID) of that electronic control apparatus. Furthermore, each failed electronic control apparatus, from which the connection information is not obtained in response to the response request, will have "0" as the result of the response request associated with the corresponding identifier (ID) of that electronic control apparatus.

That is, the read-only memory of the communication control apparatus 30 of the vehicle 100 prestores the address data (such as one shown in FIG. 6) as the connection information used in the distributed control operation performed through the on-vehicle network CN. The connection information of some of the electronic control apparatuses connected to the on-vehicle network CN is registered in this address data, so that this address data serves as partial data of the master data. Thus, the communication control apparatus 30 sends a request to the electronic control apparatuses registered in this address data to obtain the connection information of the above electronic control apparatuses connected to the on-vehicle network CN. In this way, the communication control apparatus 30 obtains the connection information of the electronic control apparatuses connected to the on-vehicle network CN, for example, in the following manner.

Here, for the sake of clear understanding, it is assumed that the first gateway control apparatus 10 among the electronic control apparatuses registered in the above address data has received the above request. In such a case, the first gateway control apparatus 10 first retrieves the address data, which is stored in a read-only memory of the first gateway control apparatus 10. Then, based on the retrieved address data, the first gateway control apparatus 10 sends the response request to the electronic control apparatuses 11-14 connected to the first network arrangement CNP1, so that the first gateway control apparatus 10 obtains the connection information of these electronic control apparatuses 11-14. Then, the thus obtained connection information of the electronic control apparatuses 11-14 is transferred from the first gateway control apparatus 10 to the communication control apparatus 30. In this way, as shown in FIG. 7A, the communication control apparatus 30 first obtains the connection information of the electronic control apparatuses 10-14 connected to the first network arrangement CNP1.

Similarly, when the second gateway control apparatus 20 receives the above request, the second gateway control apparatus 20 retrieves the address data, which is stored in a read-only memory of the second gateway control apparatus 20. Next, based on the address data, the second gateway control apparatus 20 sends the response request to the electronic control apparatus 21 connected to the second network arrangement CNP2, so that the second gateway control apparatus 20 obtains the connection information of the electronic control apparatus 21. Then, the thus obtained connection information of the electronic control apparatus 21 is transferred from the second gateway control apparatus 20 to the communication control apparatus 30. In this way, as shown in FIG. 7B, the communication control apparatus 30 obtains the connection information of the electronic control apparatuses 20-21 connected to the second network arrangement CNP2.

Furthermore, the navigation control apparatus 40 simply responds to the response request sent from the communication control apparatus 30, so that the communication control apparatus 30 obtains the connection information of the navigation control apparatus 40.

As shown in FIG. 7C, when the communication control apparatus 30 obtains the connection information of all of the electronic control apparatuses connected to the on-vehicle network CN, the communication control apparatus 30 checks the flag state of the work load share determination process completion flag at step S122. When it is determined that the work load share determination process completion flag is in the reset state, i.e., the cleared state at step S122, it is determined that the work load share determination process has not been performed, and thereby control proceeds to step S131. At step S131, the work load share determination process is executed to determine the work load share of the communication control apparatus 30 and the work load share of the control center 200.

Next, the process of step S131 (the work load share determination process at the vehicle 100 side) will be described more specifically with reference to FIG. 8.

Figure 6:
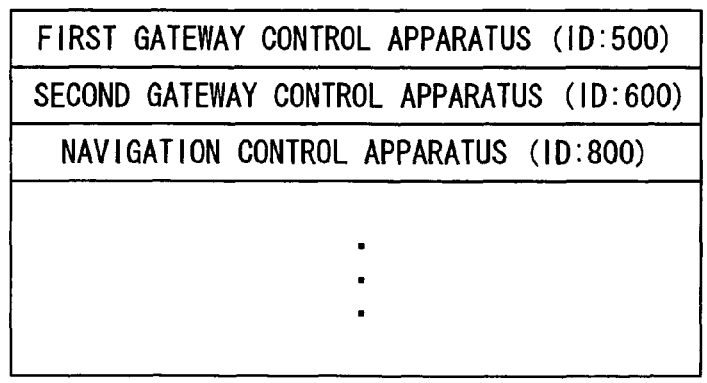
FIG. 6 is a diagram showing a structure of address data stored in the communication control apparatus (the on-vehicle control apparatus)

As shown in FIG. 8, at the time of performing the work load share determination process at the vehicle 100 side, at step S131a, the communication control apparatus 30 retrieves the above address data (FIG. 6), which has been preregistered in the read only memory of the communication control apparatus 30. Then, at step S131b, the subject electronic control apparatuses, which are the subjects to be diagnosed by the communication control apparatus 30 of the vehicle 100, are determined from the registered electronic control apparatuses, which are registered in the retrieved address data. Here, these subject electronic control apparatuses are determined depending on the current processing load (e.g., a computation load, a communication load) of the communication control apparatus 30. When the subject electronic control apparatuses, which are the subjects to be diagnosed by the communication control apparatus 30 in the vehicle 100, are determined at step S131b, control proceeds to step S131c. At step S131c, the remaining undetermined electronic control apparatuses left at step S131b are determined as the diagnosis subjects, which are diagnosed at the control center 200. Here, the subject electronic control apparatuses, which are diagnosed at the control center 200, include the unregistered electronic control apparatuses that are not registered in the address data (FIG. 6). When the diagnosis subjects of the vehicle 100 side and the diagnosis subjects of the control center 200 side are determined, control proceeds to step S131d. At step S131d, the communication control apparatus 30 requests the control center 200 to diagnose the assigned electronic control apparatuses, which are the diagnosis subjects assigned to the control center 200. Through the above operation, the diagnosis operation of the control center 200 side is performed in parallel with the diagnosis operation of the vehicle 100 side.

Here, it should be noted that depending on the processing load of the communication control apparatus 30, the diagnosis operation for diagnosing the validity of the connecting states of all of the electronic control apparatuses connected to the on-vehicle network CN could be entirely assigned to the control center 200 in the work load share determination process at step S131. Thus, as shown in FIG. 4, after the work load share determination process of step S131, the communication control apparatus 30 of the present embodiment determines whether the subject electronic control apparatus (es) assigned to the vehicle 100 side exists at step S132. When it is determined that there is no subject electronic control apparatus assigned to the vehicle 100 side at step S132, control proceeds to step S124. At step S124, the verification process flag is reset, i.e., is cleared, and the current control operation is terminated. That is, in such an instance, the diagnosis operation for diagnosing the validity of the connecting states of all of the electronic control apparatuses connected to the on-vehicle network CN is entirely performed at the control center 200.

Furthermore, when it is determined that there is the subject electronic control apparatus(es) assigned to the vehicle 100 side at step S132, the communication control apparatus 30 executes step S123. At step S123, the communication control apparatus 30 verifies the connection information, which is obtained by sending the response request to each subject electronic control apparatus, with the master data.

However, as described above, in the present embodiment, the work load share determination process at step S131 is performed according to the address data, such as the address data shown in FIG. 6. Thus, in place of the master data, the address data (FIG. 6) may be used. In such a case, the connection information, which is obtained in the vehicle 100, is verified with the address data (FIG. 6). Therefore, in this case where the address data is used in place of the master data, the communication control apparatus 30 of the present embodiment performs the verification process of step S123 according to the procedure shown in FIG. 9.

That is, at the time of performing the verification process of step S123, the above address data (FIG. 6) and the connection information, which is obtained through the above response request, are retrieved sequentially (steps S123a and S123b). Then, the connection information is verified with the retrieved address data according to the result of the work load share determination process. Thereafter, the verification result is stored in the data memory of the communication control apparatus 30 (steps S123c and S123d). Through the adaptation of the above operation, the validity of the connecting states of the electronic control apparatuses connected to the on-vehicle network CN can be appropriately diagnosed without receiving the master data from the control center 200.

Returning to FIG. 4, when the work load share determination process completion flag, which indicates the completion of the work load share determination process, is set at step S122, the connection information obtained at the vehicle side 100 is verified with the master data according to the content of the verification process execution request stored in the data memory (FIG. 5, step S14), as described above. That is, the above step S123 (steps S123a-S123d) is performed according to the diagnosis process work load share of the vehicle 100 side, which is determined at the control center 200 side.

After the execution of the verification process (step S123), control proceeds to step S124 where the verification process flag is reset, i.e., cleared, and the current control operation is terminated.

Upon the execution of the verification process of the vehicle 100 side (FIG. 4), the control center 200 receives the result of the verification process executed at the vehicle 100 side. Then, the result of the verification process executed at the vehicle 100 side and the result of the verification process executed at the control center 200 side are integrally handled by the control center 200, and thereby the diagnosis result of all of the electronic control apparatus connected to the on-vehicle network CN is integrally managed at the control center 200. When a verification error (an inconsistency) is found in the connection information obtained through the response request (FIG. 7C) upon comparison with the master data (FIG. 3), an invalid electronic control apparatus(es), which has the invalid connecting state relative to the on-vehicle network CN, is identified. For example, in the case of the result shown in FIG. 7C, the engine control apparatus 11, which corresponds to the identifier "501", is identified as having the invalid connecting state relative to the on-vehicle network CN. Thereafter, the control center 200 determines (identifies) the corresponding electronic control apparatuses (e.g., the transmission control apparatus 12 and the cruise control apparatus 14), which serve as the storage locations for storing the diagnosis information (the verification error information) of the identified invalid engine control apparatus 11. Then, control center 200 sends a request to the communication control apparatus 30 of the vehicle 100 to store the above diagnosis information in the determined corresponding electronic control apparatuses (e.g., the transmission control apparatus 12 and the cruise control apparatus 14). In response to this request, the communication control apparatus 30 of the vehicle 100 performs a fail-safe process for executing the corresponding fail-safe measure, which has been previously set for the engine control apparatus 11 that has been identified as having the invalid connecting state according to the procedure shown in FIG. 10.

Specifically, when the request for storing the diagnosis information is received from the control center 200, the communication control apparatus 30 executes step S21. At step S21, the communication control apparatus 30 determines (identifies) the corresponding electronic control apparatuses (e.g., the transmission control apparatus 12 and the cruise control apparatus 14), which need to store the above diagnosis information, based on the notification content from the control center 200. Then, at step S22, the communication control apparatus 30 transfers the diagnosis information to the determined (identified) electronic control apparatuses, so that the diagnosis information is stored in each of these determined (identified) electronic control apparatuses, and thereafter the predetermined corresponding fail-safe mode, which is preset for the diagnosis information, is executed in each of the corresponding electronic control apparatuses. That is, in the present embodiment, the communication control apparatus 30 and each of the electronic control apparatuses, which execute the corresponding fail-safe measure in response to an execution command received from the communication control apparatus 30, constitute a fail-safe processing means.

Next, the diagnosis process performed in the control center 200 side will be described with reference to FIGS. 11-16. The control center 200 of the present embodiment performs the above diagnosis process at predetermined time intervals (e.g., every week) or whenever the corresponding request is received from the vehicle 100 side.

At the time of performing the diagnosis process in the control center 200, the control center 200 performs a verification process (see FIG. 11) for verifying the connection information obtained by the vehicle 100 side with the master data and also at the same time performs a flag manipulation process (see FIG. 12) for manipulating flags used in the verification process. These processes are also repeated at predetermined intervals.

Figure 12:
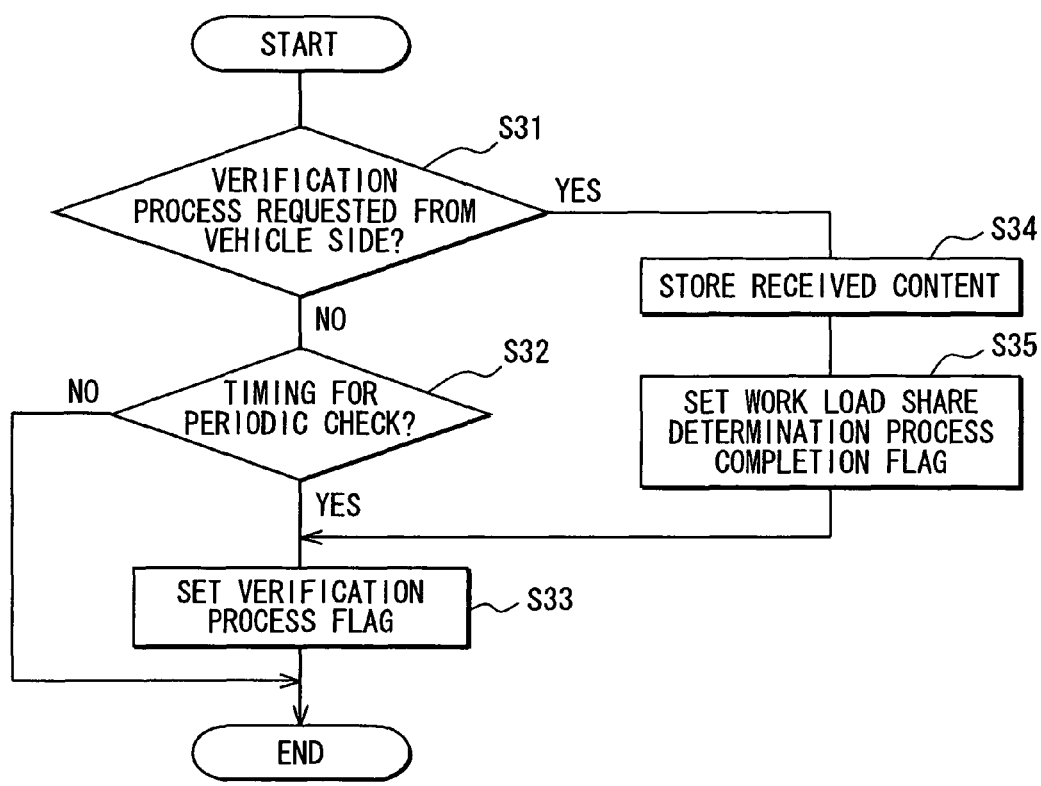
FIG. 12 is a flowchart showing a procedure for manipulating a verification process flag and a work load share determination process completion flag in the control center.

At the time of executing the flag manipulation process, as shown in FIG. 12, the control center 200 first determines whether a verification process execution request has been received from the vehicle 100 side at step S31. When it is determined that the verification process execution request has not been received from the vehicle 100 side, control proceeds to step S32. At step S32, the control center 200 determines whether one week has elapsed since the previous diagnosis execution date based on, for example, a diagnosis execution history. When it is determined that the one week has elapsed since the previous diagnosis execution date, control proceeds to step S33. At step S33, a verification process flag, which indicates a need for performing the verification process, is set, and the current control operation is terminated.

In contrast, when it is determined that the one week has not elapsed since the previous execution date at step S32, the verification process flag is kept reset, i.e., cleared, and the current control operation is terminated.

When the verification process execution request is received from the vehicle 100 side upon the execution of the work load share determination process (step S131d in FIG. 8) in the vehicle 100 side at step S31, the verification process flag is set (step S33). At this time, before the manipulation of the verification process flag, control proceeds to step S34. At step S34, the content of the request from the vehicle 100 side (e.g., the result of the work load share determination process executed at the vehicle 100 side) is stored in the predetermined memory in the control center 200. Then, at step S35, the work load share determination process completion flag, which indicates the completion of the workload share determination process, is set. Through the above processes, in the control center 200, the content of the verification process execution request stored in the above memory is executed, i.e., the connection information obtained in the vehicle 100 side is verified with the master data according to the work load share of the control center 200 side, which is determined at the vehicle 100 side. The flags manipulated at the control center 200 are stored in the memory in the control center 200.

Figure 11:
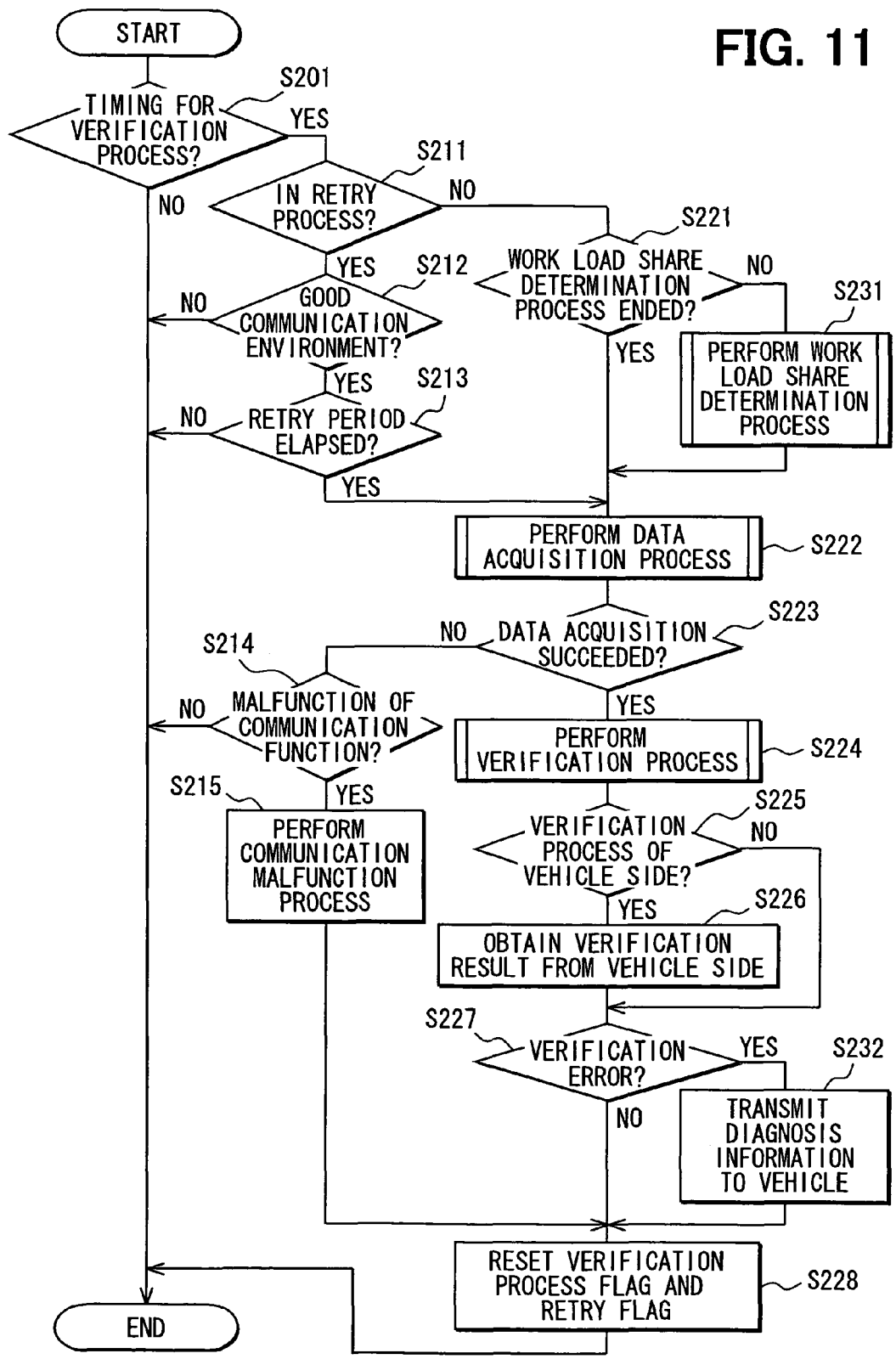
FIG. 11 is a flowchart showing a procedure for verifying connection information obtained at the vehicle side with the master data in the control center.

Then, in the control center 200, as described above, the verification process for verifying the connection information obtained by the vehicle 100 side with the master data is performed based on the flowchart shown in FIG. 11 simultaneously with the above flag manipulation process (FIG. 12).

That is, as shown in FIG. 11, at step S201, the control center 200 of the present embodiment will wait until the verification process flag is set. When it is determined that the verification process flag is set, it is then determined that the verification process needs to be performed, so that control proceeds to step S211. At step S211, a flag state of a retry flag, which indicates that control needs to proceed to a retry process for retrying information exchange relative to the vehicle 100, is checked. As will be described in greater detail, the retry flag is a flag, which is kept set in response to the failure of the acquisition of the information (the connection information) that is transmitted from the vehicle 100 side through the radio communication. For example, the retry flag is stored in the predetermined memory in the control center 200 and is manipulated at the control center 200. Thus, when it is determined that the retry flag is set at step S211, the retry process for reacquiring the information transmitted from the vehicle through the radio communication, is executed.

In contrast, when it is determined that the retry flag is reset, i.e., cleared at step S211, control proceeds top step S221. At step S221, the control center 200 checks the flag state of the work load share determination process completion flag, which indicates the completion of the work load share determination process. When it is determined that the work load share determination process completion flag is in the reset state, i.e., the cleared state at step S221, it is determined that the work load share determination process has not been performed, and thereby control proceeds to step S231. At step S231, the work load share determination process is executed to determine the work load share of the vehicle 100 side and the work load share of the control center 200 side.

In this embodiment, the communication control apparatus 30 of the vehicle 100 side verifies the connection information obtained by the vehicle 100 with the address data (FIG. 6), which serves as the substitute information of the above master data. Thus, when the diagnosis of the electronic control apparatus, which has not been registered in this address data of the communication control apparatus 30, is requested to the communication control apparatus 30, the validity of such diagnosis made by the communication control apparatus 30 cannot be ensured. Therefore, in the present embodiment, the work load share determination process (step S231) is performed in such a manner that the electronic control apparatus(es), which is not registered in the address data of the communication control apparatus 30, is preset as the diagnosis subject(s) to be diagnosed by the control center 200. Specifically, for example, the electronic control apparatuses, which are registered in the master data as the storage locations for storing the diagnosis information of the communication control apparatus 30 in response to the identifier of the communication control apparatus 30, generally coincide with the electronic control apparatuses, which are registered in the address data of the communication control apparatus 30. Based on this fact, the following operation is performed according to the procedure shown in FIG. 13.

Figure 13:
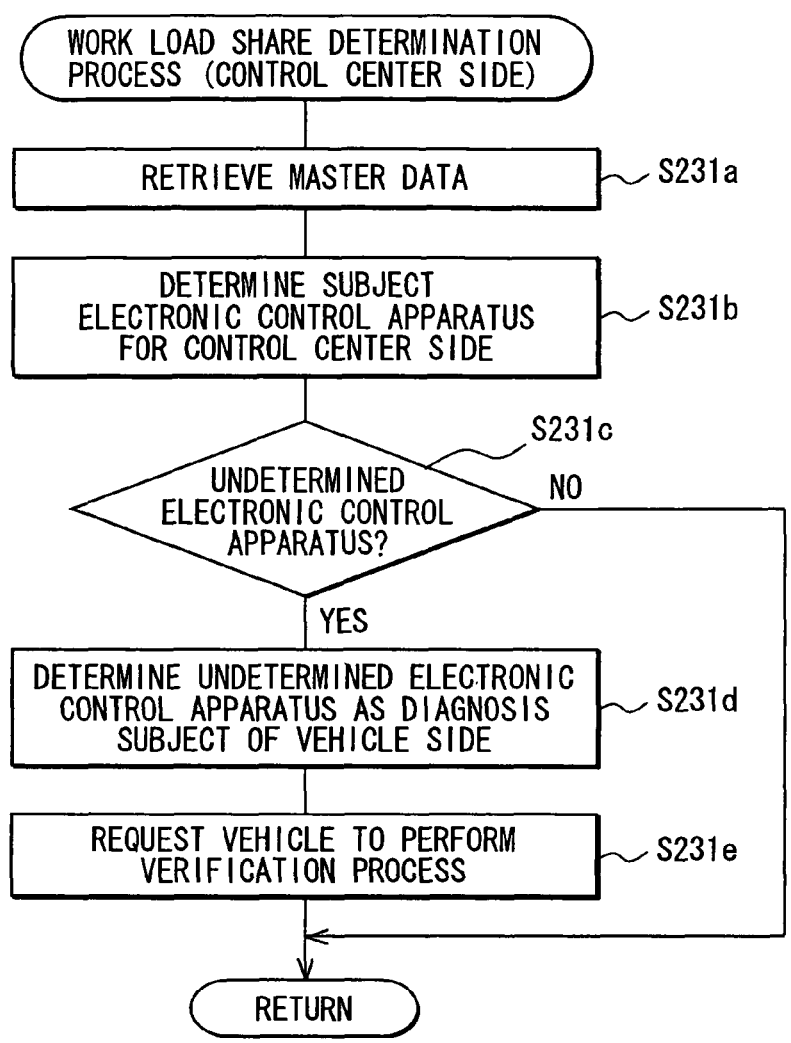
FIG. 13 is a flowchart showing a procedure for determining a work load share of the communication control apparatus (the on-vehicle control apparatus) and a work load share of the control center in the control center.
Figure 14:
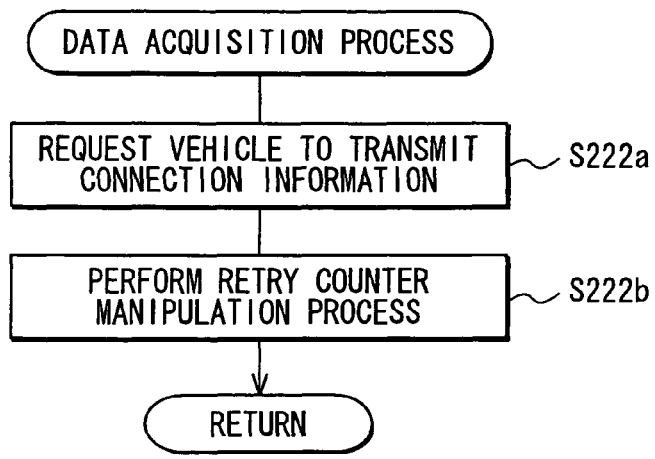
FIG. 14 is a flowchart showing a procedure for obtaining information, which is required in the verification process at the control center, from the vehicle through radio communication in the control center.

Specifically, as shown in FIG. 13, at the time of work load share determination process performed in the control center 200, the control center 200 retrieves the master data (FIG. 3), which is stored in the master data storage 201, at step S231a. Then, the control center 200 determines the subject electronic control apparatus(es), which needs to be diagnosed at the control center 200 side, among the electronic control apparatuses, which are registered as the storage locations for storing the diagnosis information (the verification error information) of the communication control apparatus 30 when the connecting state of the communication control apparatus 30 is diagnosed as invalid (step S231b). In the work load share determination process performed at the control center 200 side, the control center 200 determines whether the other electronic control apparatuses, which are not registered as the storage locations for storing the diagnosis information (the verification error information), need to be assigned to the control center 200 as part of its work load share based on the processing load (e.g., a computation load, a communication load) of the control center 200. Then, when the diagnosis subjects of the control center 200 are determined, the control center 200 determines whether all of the electronic control apparatuses, which are registered as the storage locations for storing the diagnosis information (the verification error information), are assigned to the control center 200 as its diagnosis subjects at step S231c. Then, when it is determined that all of the electronic control apparatuses are assigned to the control center 200 as its diagnosis subjects at step S231c, the control center 200 terminates the current control operation without requesting the above verification process to the communication control apparatus 30 of the vehicle 100. That is, in such an instance, the diagnosis operation for diagnosing the validity of the connecting states of all of the electronic control apparatuses connected to the on-vehicle network CN is entirely performed at the control center 200.

In contrast, when the result of the determination at step S231c indicates that an unassigned electronic control apparatus(es) still exists, control proceeds to step S231d. At step S231d, the unassigned electronic control apparatus(es) is determined as the diagnosis subject(s) of the vehicle 100 side. Thereafter, at step S231e, the control center 200 requests the vehicle 100 to diagnose the assigned diagnosis subjects of the vehicle 100. In this way, the diagnosis operation of the vehicle 100 is performed in parallel with the diagnosis operation of the control center 200.

When the work load share determination process (step S231) of the control center 200 is completed, control proceeds to step S222 in FIG. 11. At step S222, based on the procedure indicated in FIG. 14, the control center 200 performs acquisition (a data acquisition process) of the corresponding information, which is required to perform the verification process at the control center 200 side, from the communication control apparatus 30 of the vehicle 100 through the radio communication. In the present embodiment, the master data storage 201, which stores the master data, is provided in the control center 200. Thus, at the time of performing the data acquisition process, the control center 200 sends a transmission request for transmitting the connection information of the electronic control apparatuses, which are determined as the diagnosis subjects of the control center 200, to the communication control apparatus 30 of the vehicle 100 at step S222a. Then, as will be described in greater detail, the control center 200 performs a retry counter manipulation process for manipulating a flag or a counter used in the retry process at step S222b.

On the other hand, when the result of the determination made at step S221 indicates that the work load share determination process completion flag is set to indicate the completion of the work load share determination process, control skips the work load share determination process of the control center 200 (step S231) and proceeds to step S222. Specifically, in this instance, at step S222a, the control center 200 sends the transmission request for transmitting the connection information of the electronic control apparatuses, which are assigned to the control center 200 through the work load share determination process of the vehicle 100 and are thereby to be diagnosed at the control center 200, to the communication control apparatus 30 of the vehicle 100.

After the data acquisition process, it is determined whether the connection information from the communication control apparatus 30 of the vehicle 100 is appropriately received in the control center 200 at step S223. When the result of this determination made at step S223 indicates that the reception of the connection information has failed, the retry process described latter will be performed.

Figure 15:
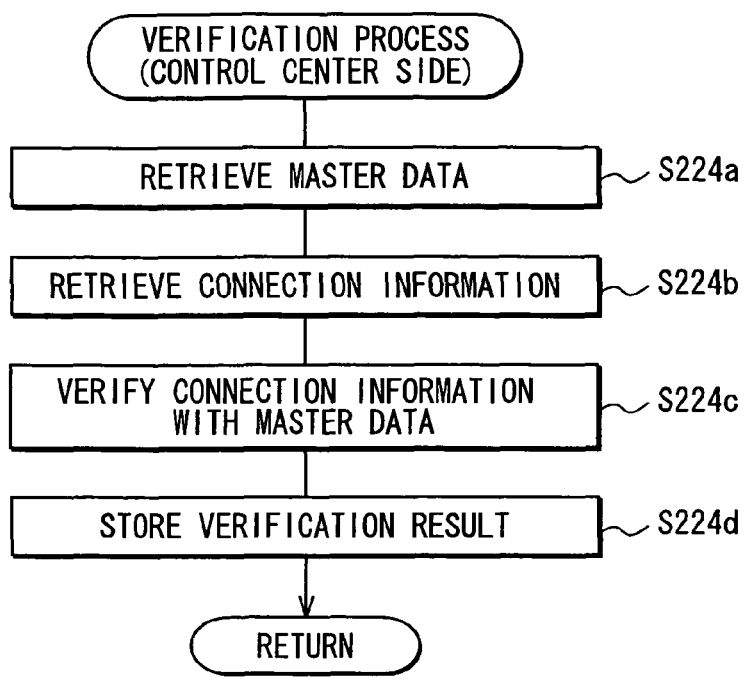
FIG. 15 is a flowchart showing the procedure for verifying the connection information obtained at the vehicle side with the master data in the control center.

In contrast, when it is determined that the connection information is appropriately received by the control center 200 at step S223 and thereby is stored in, for example, the memory of the control center 200, control proceeds to step S224. At step S224, this connection information is verified with the master data according to the result of the work load share determination process. Specifically, as shown in FIG. 15, at the time of performing the verification process, the master data (FIG. 3) and the connection information received from the communication control apparatus 30 of the vehicle 100 are sequentially retrieved (steps S224a, S224b). Then, the retrieved connection information is verified with the retrieved master data, and its verification result is stored in the predetermined memory of the control center 200 (steps S224c, S224d).

Then, at step S225, the electronic control apparatuses, which are registered in the master data, are compared with the subject electronic control apparatuses, which are assigned to the control center 200 as the diagnosis subjects. Through this comparison, it is determined whether the diagnosis subject(s) of the vehicle 100 exists. Upon this determination, when it is determined that the diagnosis subject(s) of the vehicle 100 exists, the result of the verification process for this diagnosis subject(s) is received from the communication control apparatus 30 at step S226. Then, at step S227, the result of the verification process received from the communication control apparatus 30 is compared with the result of the verification process executed in the control center 200 for that diagnosis subject(s), and it is determined whether there is an error in the result of the verification process executed in the vehicle 100 and the result of the verification process executed in the control center 200. When it is determined that the diagnosis subject(s) of the vehicle 100 does not exist, it is determined whether there is an error in the result of the verification process executed in the control center 200 at step S227. When it is determined that there is no error in the result of the verification process, control proceeds to step S228. At step S228, the verification process flag and the retry flag are reset, and the current control operation is terminated.

In contrast, when it is determined that there is the error in the result of the verification process at step S227, control proceeds to step S232 before the manipulation of the flags (step S228). At step S232, the electronic control apparatus (es), which is diagnosed as having the invalid connecting state, is identified. Then, based on the master data, the control center 200 sends to the communication control apparatus 30 of the vehicle 100 a request for storing the above diagnosis information in the respective registered electronic control apparatuses, which are registered as the storage locations for storing the above diagnosis information. That is, in this way, in the vehicle 100, the diagnosis information is stored in the respective corresponding electronic control apparatuses, and the predetermined fail-safe measure previously set for that particular diagnosis information is executed.

Next, there will be described the retry process, which is performed when the information (the connection information) transmitted from the communication control apparatus 30 of the vehicle 100 through the radio communication is not appropriately received.

Figure 16:
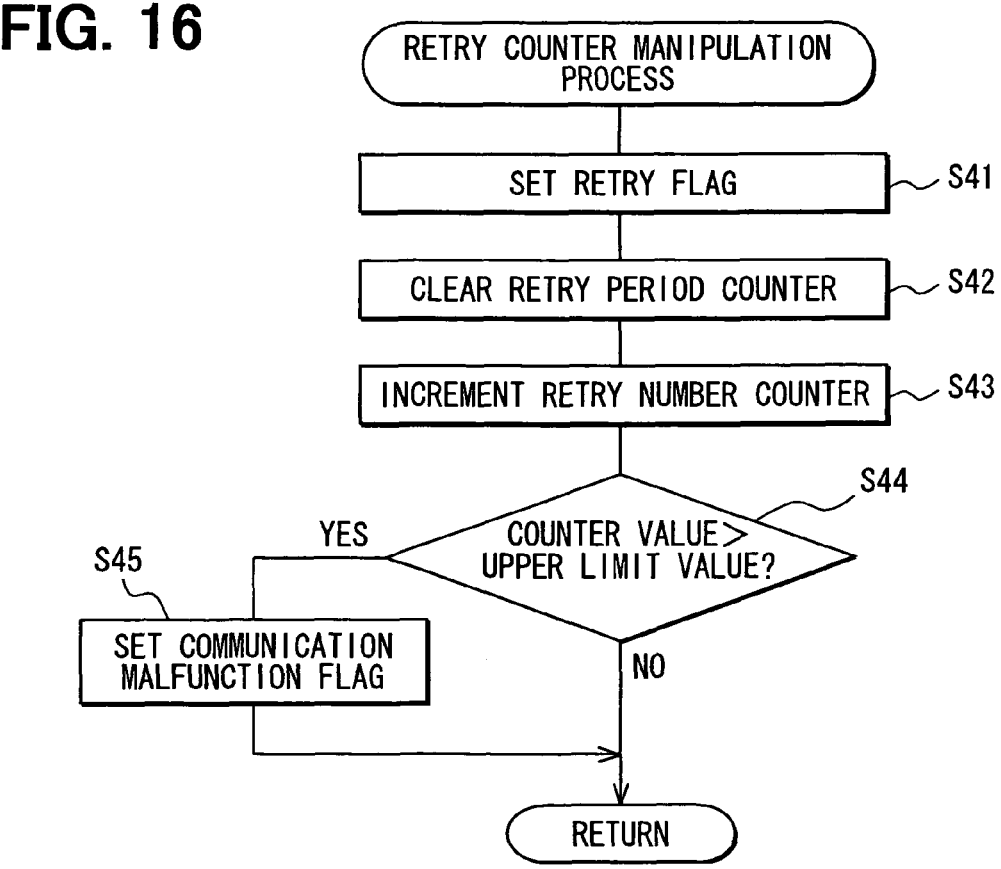
FIG. 16 is a flowchart showing a procedure for performing a retry process that is executed in the control center when information (connection information) transmitted from the communication control apparatus of the vehicle through the radio communication is not appropriately received by the control center.

First, the retry counter manipulation process (step S222b), which is executed as part of the data acquisition process (step S222), will be described with reference to FIG. 16. The respective flag and counter used in this process are provided in the control center 200 and are manipulated by the control center 200.

In this process, first, at step S41, the retry flag, which indicates the shift of the operation to the following retry process, is set. Then, at step S42, a retry period counter is cleared. The retry period counter indicates an elapsed time period since the execution of the previous retry process. Furthermore, the retry period counter may be a free-run counter. Then, at step S43, a retry number counter is incremented. The retry number counter counts the number of executions (the executed number) of the following retry process. After the manipulation of the flag and the counter, control proceeds to step S44. At step S44, it is determined whether the counter value of the retry number counter has exceeded a preset upper limit value. When it is determined that the counter value has exceeded the upper limit value, the total number of executions of the retry process has exceeded a predetermined number (an upper limit value). This indicates a possibility of that the communication between the control center 200 and the vehicle 100 is malfunctioning. In such a case, at step S45, a communication malfunction flag, which indicates the malfunctioning of the communication between the control center 200 and the vehicle 100, is set. Normally, the count value of the retry number counter is equal to or below its upper limit value, and the communication malfunction flag is kept reset, i.e., cleared. Thereby, normally, the operation proceeds to step S223.

Through the retry counter manipulation, when it is determined that the information (the connection information) transmitted from the communication control apparatus 30 of the vehicle 100 through the radio communication is not appropriately received at step S223, the operation is shifted to the following retry process.

Specifically, in such a case, it is first confirmed that the communication malfunction flag is reset (a process of step S214). Then, the reset states, i.e., cleared states of the verification process flag and of the reset flag are maintained (without performing the process of step S228), and the current control operation is terminated. In this way, at step S201 of the next process turn of the control flow (FIG. 11), the verification process flag is placed in the set state, and thereby it is determined that the verification process needs to be executed. Furthermore, in the process of the next step S211, the retry flag is placed in the set state, and thereby it is determined that the information transmission between the control center 200 and the vehicle 100 needs to be re-executed, so that the operation is shifted to the following retry process.

Specifically, the process of step S222 is re-executed upon satisfaction of the following two conditions: the communication environment between the control center 200 and the communication control apparatus 30 of the vehicle 100 is good (step S212); and the elapsed time period since the execution of the previous retry process is equal to or greater than the predetermined value (step S213). That is, the transmission request is sent once again from the control center 200 to the communication control apparatus 30 of the vehicle 100 (step S222*a*). Furthermore, the set state of the retry flag is maintained (step S41). In addition, the retry period counter is cleared (step S42), and the retry number counter is incremented (step S43). Thereafter, when it is determined that the information (the connection information), which is transmitted from the communication control apparatus 30 of the vehicle 100, is appropriately received at step S223, then steps S224-S228, S232 are executed, and the current control operation is terminated.

In contrast, when it is determined that the information (the connection information), which is transmitted from the communication control apparatus 30 of the vehicle 100, is not appropriately received at step S223, the above retry process is repeated until it is determined that the information (the connection information) is appropriately received at step S223. At this time, in the process of step S222, when it is determined that the counter value of the retry number counter exceeds its upper limit value (step S44), the communication malfunction flag is set (step S45). Then, at step S214, it is determined that the communication between the control center 200 and the communication control apparatus 30 of the vehicle 100 is malfunctioning. In such a case, the control center 200 provides a corresponding notification to the user (the driver) through a known communicating means, such as mail transmission to a pre-registered cellular phone at step S215. Thereafter, the verification process flag and the retry flag are reset, i.e., cleared at step S228, and the current operation is terminated.

After shipment of the vehicle 100 to the market, the optional control apparatus 21 (FIG. 1) described above may be newly installed to the vehicle 100. In such a case, the master data, which is stored in the master data storage 201, does not have the connection information of the newly installed optional electronic control apparatus 21. Thus, it is difficult to diagnose the validity of the connecting state of the newly installed optional electronic control apparatus 21 based on the master data. However, in the case of the on-vehicle network diagnosis system of the present embodiment, when the new electronic control apparatus, which is not listed, i.e., registered in the master data of the master data storage 201, is connected to the on-vehicle network CN, the master data is automatically renewed to include the new electronic control apparatus. Thus, after the shipment of the vehicle 100 to the market, even when the optional control apparatus 21 is newly installed to the vehicle 100, the validity of the connecting state of the optional control apparatus 21 can be diagnosed based on the master data.

Figure 17:
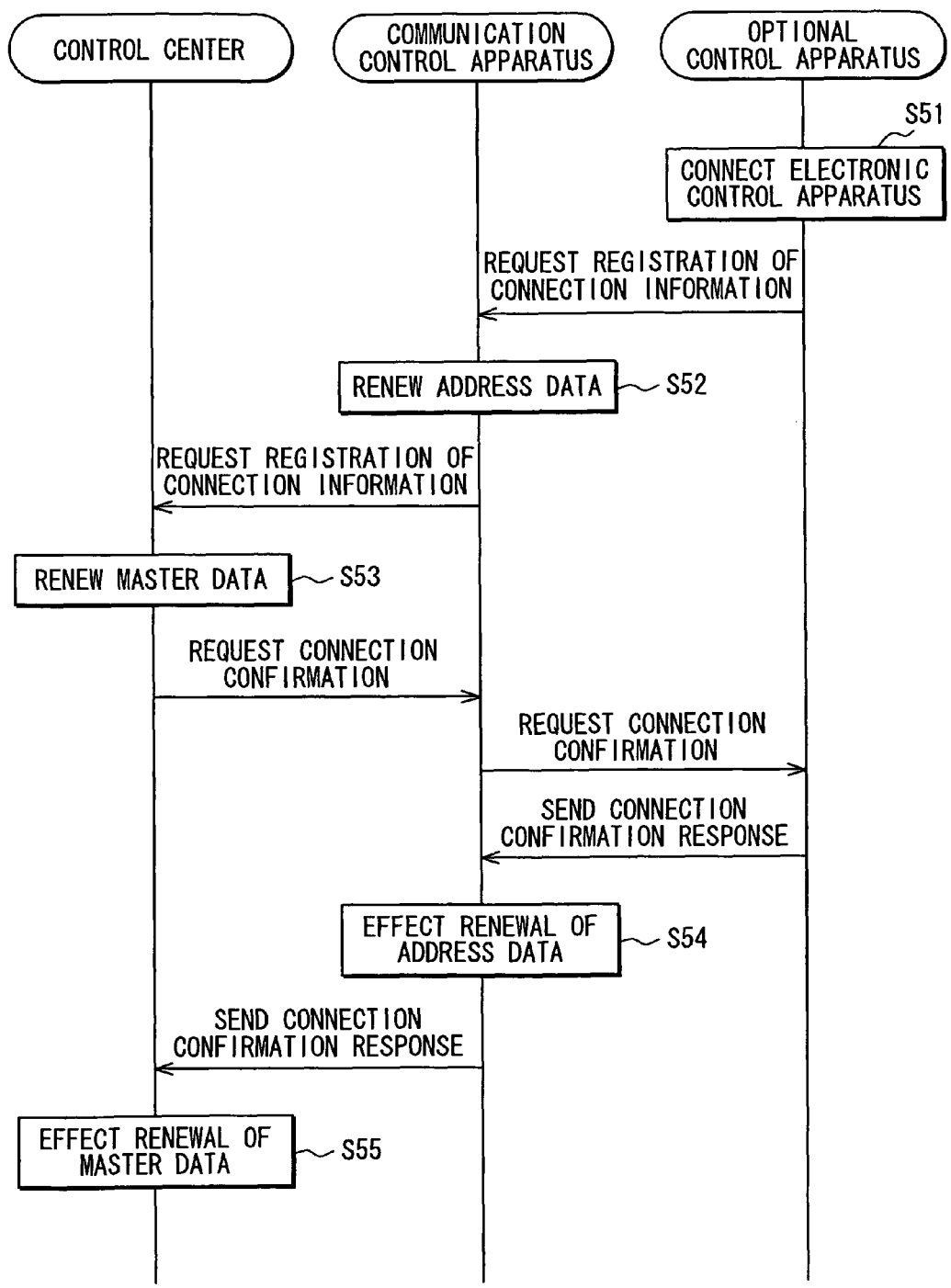
FIG. 17 is a sequence chart showing a procedure for automatically renewing master data.

FIG. 17 is a sequence chart, which shows the procedure of the automatic renewal of the master data. This procedure will be described with reference to FIG. 17.

In the on-vehicle network diagnosis system according to the present embodiment, when the new electronic control apparatus is connected to the on-vehicle network CN, a registration request (a connecting request) for registering the connection information of the new electronic control apparatus is transmitted from the new electronic control apparatus to the communication control apparatus 30 of the vehicle 100 through the on-vehicle network CN.

Thus, as shown in FIG. 17, when the optional control apparatus 21 is connected to the on-vehicle network CN at step S51, the optional control apparatus 21 first sends the registration request for registering its connection information to the communication control apparatus 30 of the vehicle 100 through the communication buses BS2, BS3. In response to this, at step S52, the communication control apparatus 30 of the vehicle 100 renews the address data stored in the communication control apparatus 30 based on the connection information, which is transmitted along with the content of the request from the optional control apparatus 21. Then, the registration request from the optional control apparatus 21 is transferred to the control center 200. In this way, in the control center (a master data renewing means) 200, the master data stored in the master data storage 201 is automatically renewed by adding the transferred connection information at step S53. At this time, it is practically desirable that a connection position of the optional control apparatus 21, which is hierachized in a manner that corresponds to the network structure (the on-vehicle network CN), is registered in correlation with the identifier of the optional control apparatus 21 and the identification code of the vehicle 100.

After step S53, as shown in FIG. 17, the control center 200 sends a connection confirmation request to the optional control apparatus 21 through the communication control apparatus 30 of the vehicle 100. In response to this, the optional control apparatus 21 sends a connection confirmation response, which indicates the confirmation of the connection, to the communication control apparatus 30 of the vehicle 100 through the communication buses BS2, BS3. Then, the communication control apparatus 30 transfers the connection confirmation response, which indicates the connection confirmation made by the optional control apparatus 21, to the control center 200. In this way, upon satisfaction of the condition of that the connection confirmation response of the optional control apparatus 21 is valid, the renewal of the address data stored in the communication control apparatus 30 of the vehicle 100 and the renewal of the master data stored in the master data storage 201 of the control center 200 are respectively effected (steps S54, S55).

As described above, the on-vehicle network diagnosis system and the on-vehicle control apparatus used therein according to the present embodiment provide the following advantages.

(1) The on-vehicle network diagnosis system has the master data storage 201 that stores the master data, which is the connection information of the electronic control apparatuses connected to the on-vehicle network CN. At the time of diagnosing the validity of the connecting state of the corresponding electronic control apparatus relative to the on-vehicle network CN, the connection information of this particular electronic control apparatus, which is obtained through processing of the response request in the electronic control apparatus in the vehicle 100, is verified with the master data. Thus, the highly accurate diagnosis result can be obtained.

(2) In the distributed control system, which diagnoses the validity of the connecting state of the electronic control apparatuses to the on-vehicle network of each corresponding vehicle, the above diagnosis is made using the master data. In this way, the degree of freedom with respect to the use of the diagnosis result is improved, so that appropriate service can be implemented in the wider range.

(3) The connection information of the electronic control apparatuses in the vehicle 100 is obtained by the communication control apparatus 30 as the integrated information, into which the connection information obtained for each electronic control apparatus registered in the address data is integrated. Thus, the verification of the connection information with the master data can be integrally performed, so that the result of the diagnosis can be more easily obtained. Furthermore, in the control center 200, the connection information can be integrally received from the vehicle 100, so that the reception of the connection information is eased.

(4) The master data storage 201, which stores the master data, is provided in the control center 200, so that the various services, such as the services described in the above sections (I)-(IV), can be more appropriately provided.

(5) The diagnosis of the validity of the connecting state of the electronic control apparatuses in the vehicle 100 is shared between the communication control apparatus 30 of the vehicle 100 and the control center 200. Thus, the processing capacity of the entire on-vehicle network diagnosis system can be effectively used to perform the above diagnosis process.

(6) The work load share of the vehicle 100 and the work load share of the control center 200 are determined based on the processing load of one of the vehicle 100 side and the control center 200 side at each time, so that the processing capacity (load allowance) of the vehicle 100 and of the control center 200 can be more effectively used at the time of making the diagnosis.

(7) The master data storage 201 is provided only in the control center 200 side. Furthermore, the work load share of the vehicle 100 and the work load share of the control center 200 with respect to the diagnosis are determined according to the address data of the communication control apparatus 30 of the vehicle 100. In the above system, the communication control apparatus 30 uses the address data stored in the read only memory of the communication control apparatus 30 in place of the above master data. Then, the connection information obtained by the vehicle is verified with this address data. Therefore, at the vehicle 100 side, the validity of the connecting states of the electronic control apparatuses connected to the on-vehicle network CN can be appropriately determined without receiving the master data from the control center 200.

(8) The identifier of each of the electronic control apparatuses connected to the on-vehicle network CN is registered in the master data in correlation with the identifiers of the electronic control apparatuses, each of which serves as the storage location for storing the diagnosis information of each corresponding invalid electronic control apparatus when this electronic control apparatus is diagnosed as having the invalid connecting state. Furthermore, at the time of performing the distributed control operation through the on-vehicle network CN, each communicating electronic control apparatus, which communicates the information with the identified invalid electronic control apparatus that is diagnosed as having the invalid connecting state, is registered in the master data as a storage location for storing the diagnosis information of the identified invalid electronic control apparatus. This is done for each registered electronic control apparatus, which is registered in the master data, along with its identifier.

Thus, when the connection abnormality exists in the on-vehicle network CN, the above diagnosis information can be stored only in the electronic control apparatuses, which need to shift its operation to the fail-safe operational mode. Thus, the appropriate fail-safe measure can be executed as the distributed control system of the vehicle 100.

(9) The control center 200 has the storage means (the communication abnormality history storage means) for storing the communication abnormality history (the retry flag) when the communication abnormality occurs at the time of transferring the information from the vehicle 100 to the control center 200 through the radio communication. The retry process of the information transferring is executed based on the fact that the above communication abnormality history is stored in the storage means at the time of re-establishment of the radio communication, i.e., based on the fact that the retry flag is set at the time of re-establishment of the radio communication. Thus, the transferring of the information between the vehicle 100 and the control center 200 through the radio communication can be more reliably performed.

(10) When the new electronic control apparatus, which is not listed on the master data stored in the master data storage 201, is connected to the on-vehicle network CN, the master data in the master data storage 201 is renewed. Thus, when the optional control apparatus 21 is newly installed in the vehicle 100 after the shipment of the vehicle 100 to the market, the validity of the connecting state of the control apparatus 21 can be diagnosed based on the master data.

(11) The data structure of the master data includes the connection position of each corresponding electronic control apparatus, which is hierachized in the manner that corresponds to the network structure. Furthermore, in the data structure of the master data, the identifier of each corresponding electronic control apparatus connected to the on-vehicle network CN is registered in correlation with the vehicle identification code. With the above master data having the above data structure, the management of the diagnosis result of the network of each corresponding vehicle is eased at the control center 200.

Second Embodiment

Figure 18:
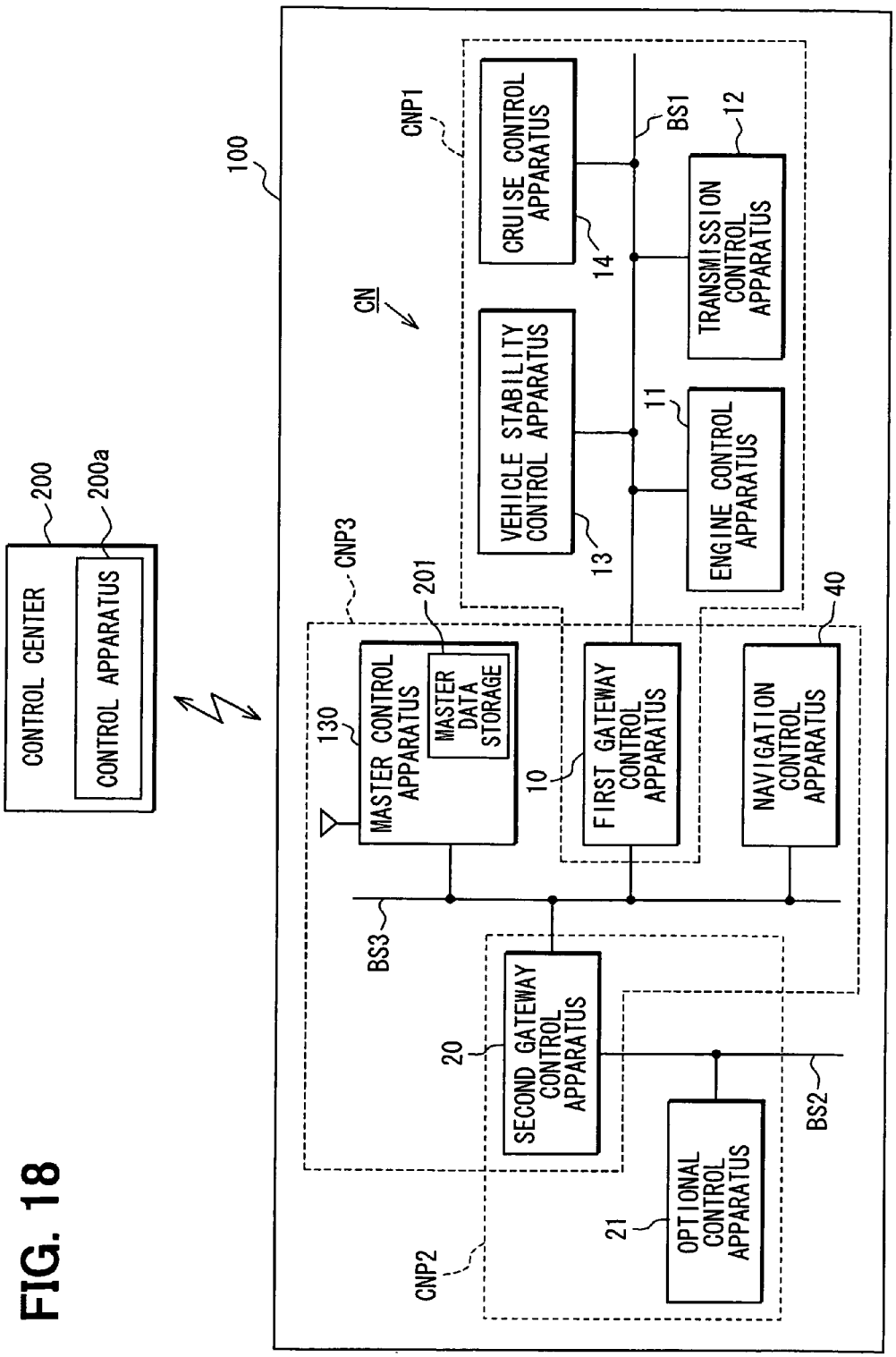
FIG. 18 is a block diagram showing a structure of an on-vehicle network diagnosis system according to a second embodiment of the present invention.

An on-vehicle network diagnosis system and an on-vehicle control apparatus used therein according to a second embodiment of the present invention will be described. Similar to the on-vehicle network diagnosis system (FIG. 1) of the first embodiment, in the on-vehicle network diagnosis system of the second embodiment, the validity of the connecting state of the respective electronic control apparatuses in the distributed control system of each subject vehicle with respect to the on-vehicle network is diagnosed. As shown in FIG. 18, similar to the first embodiment, the on-vehicle network CN of the present embodiment includes three network arrangements, which use different communication protocols, respectively. These network arrangements are interconnected through the gateways.

However, in the present embodiment, among the three network arrangements, the network arrangement CNP3 includes a master control apparatus 130. The master control apparatus 130 integrally controls the information of all of the electronic control apparatuses connected to the on-vehicle network CN. In the present embodiment, the master control apparatus 130 of the vehicle 100 includes the master data storage 201. Thus, the master control apparatus 130 serves as the on-vehicle control apparatus, which can verify the connection information obtained in the vehicle 100 with the master data stored in the master data storage 201. The diagnosis of the connection abnormality of the on-vehicle network CN is shared between the master control apparatus 130 and the control center 200 (serving as the diagnosing means). With the above construction, the information, which is required in the above verification, is exchanged between the vehicle 100 and the control center 200, so that the more accurate diagnosis result can be obtained. The master control apparatus 130 has the communication function (a communicating means) for sending and receiving the information relative to the control center 200 through the radio communication. Thus, the master control apparatus 130 is provided in place of the communication control apparatus 30 of the first embodiment in the network arrangement CNP3.

In the present embodiment, the master data, which is used in the diagnosis, is substantially the same as the master data of the first embodiment.

That is, the master data, which is the connection information of the electronic control apparatuses connected to the on-vehicle network, includes the connection position of each corresponding electronic control apparatus, which is hierachized in a manner that corresponds to the network structure.

Furthermore, at the time of performing the distributed control operation through the on-vehicle network, each communicating electronic control apparatus, which communicates the information with the identified invalid electronic control apparatus that is diagnosed as having the invalid connecting state, is registered in the master data as a storage location for storing the diagnosis information of the identified invalid electronic control apparatus. This is done for each registered electronic control apparatus, which is registered in the master data, along with its identifier.

Furthermore, the data structure of the message, which is used to transmit the information between the master control apparatus 130 and the control center 200 through the radio communication, is substantially the same as that of the first embodiment.

Next, the diagnosis process for diagnosing the validity of the connecting state of the respective electronic control apparatuses of the vehicle 100 relative to the on-vehicle network CN performed under cooperation between the master control apparatus 130 of the vehicle 100 and the control center 200 in the on-vehicle network diagnosis system will be described with reference to FIGS. 19 to 22. In the on-vehicle network diagnosis system, the master data storage 201 is provided only to the vehicle 100. Thus, the work load share determination process for determining the work load share of the vehicle 100 and the work load share of the control center 200 is performed only in the master control apparatus 130 of the vehicle.

First, with reference to FIGS. 19 to 22, the diagnosis process executed by the master control apparatus 130 of the vehicle 100 will be described.

Even in the present embodiment, at the time of performing the diagnosis process in the vehicle 100, the master control apparatus 130 performs a verification process (see FIG. 19) for verifying the connection information obtained by the vehicle 100 side with the master data and also at the same time performs a flag manipulation process (see FIG. 20) for manipulating a flag used in the verification process. These processes are repeated at predetermined intervals.

Figures 20, 21A, 21B, 21C, 21D:
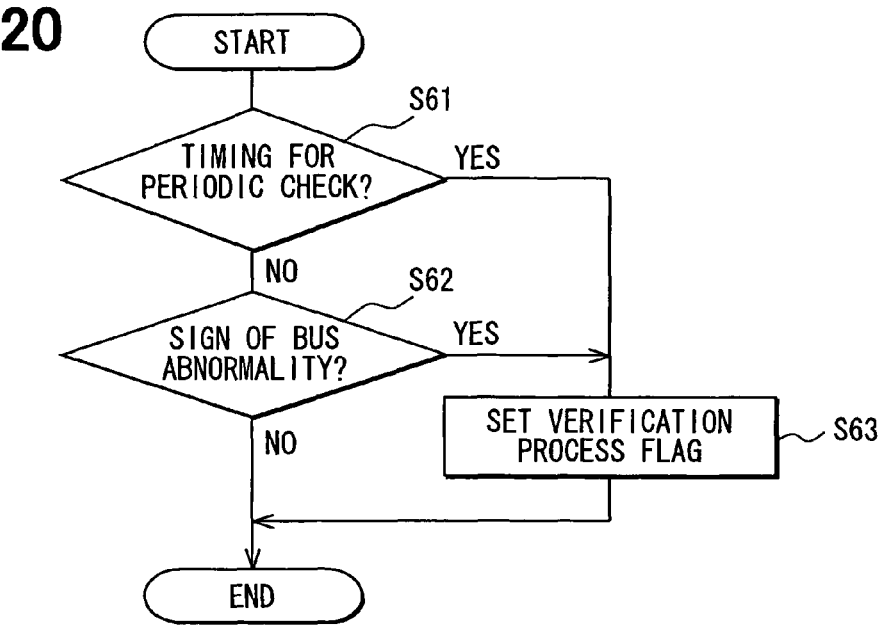
FIG. 20 is a flowchart showing a procedure for manipulating a verification process flag and a work load share determination process completion flag in the master control apparatus (the on-vehicle control apparatus) of the vehicle.
FIGS. 21A-21D are diagrams illustrating a way of obtaining information of electronic control apparatuses connected to an on-vehicle network in the vehicle.

At the time of performing the flag manipulation process, as shown in FIG. 20, the master control apparatus 130 will wait until it is determined that one week has elapsed since the previous diagnosis execution date (step S61) or it is determined that a sign of the connection abnormality exists in the on-vehicle network CN (step S62). When one of the above two conditions is satisfied (i.e., YES in one of step S61 and step S62), a verification process flag, which indicates a need for performing the verification process, is set, and the current control operation is terminated.

Figure 19:
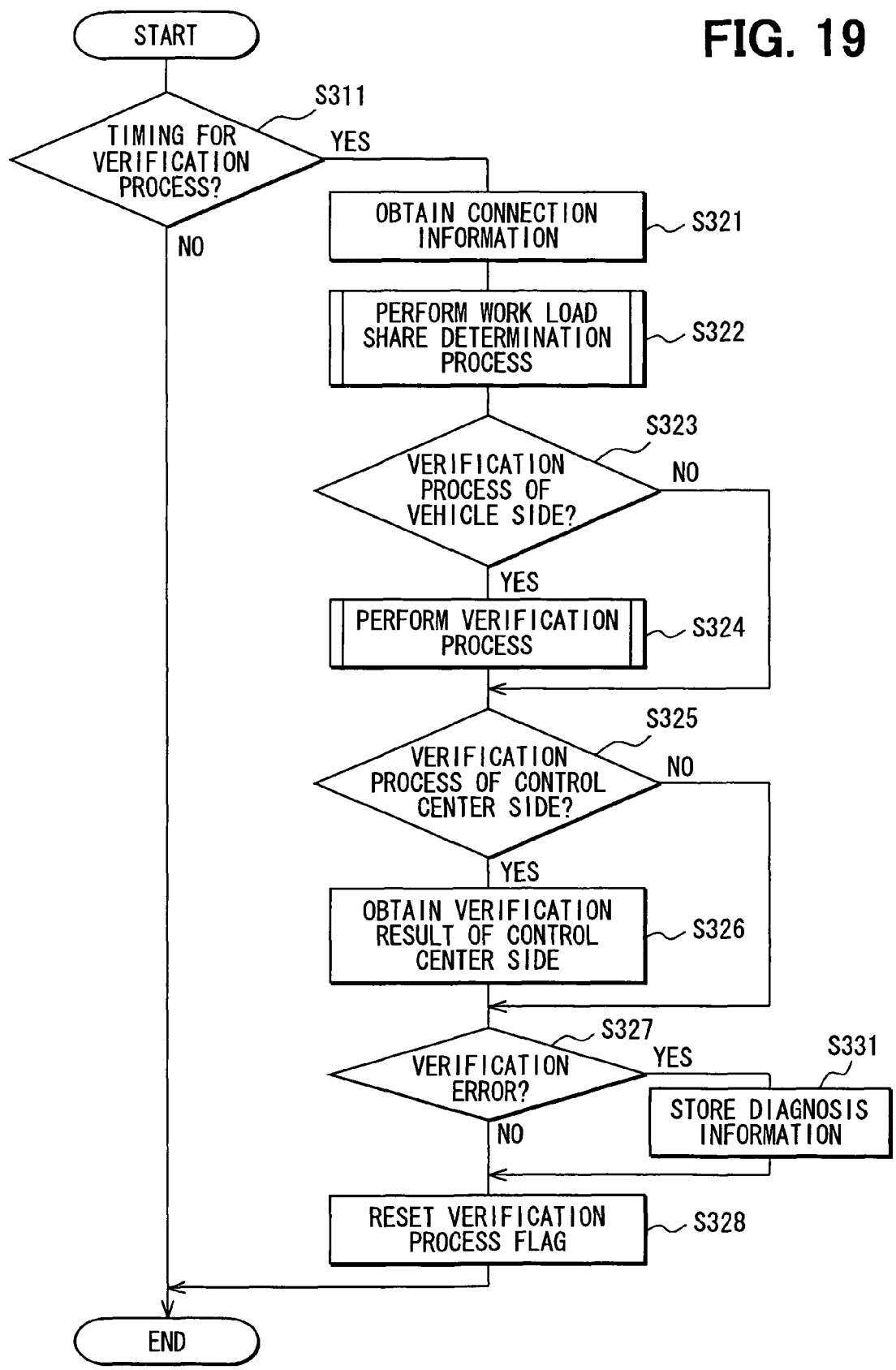
FIG. 19 is a flowchart showing a procedure for verifying connection information obtained at the vehicle side with the master data in a master control apparatus (an on-vehicle control apparatus) of the vehicle.

Then, in the master control apparatus 130 of the vehicle 100, as described above, the verification process for verifying the connection information obtained by the vehicle 100 side with the master data is performed according to the flowchart shown in FIG. 19 simultaneously with the above flag manipulation process (FIG. 20).

That is, as shown in FIG. 19, at step S311, the master control apparatus 130 of the present embodiment will wait until the verification process flag is set. When it is determined that the verification process flag is set at step S311, it is then determined that the verification process needs to be performed, so that control proceeds to step S321. At step S321, the connection information of the electronic control apparatuses relative to the on-vehicle network CN is obtained through a response request outputted to these electronic control apparatuses.

Now, the process of step S321 will be specifically described with reference to FIGS. 21A to 21D. FIGS. 21A-21D indicate the data structure of the data memory of the master control apparatus 130. This data memory includes storage locations. Each of the storage locations stores the result of the response request of the corresponding one of the electronic control apparatuses, which are registered in the master data of the master data storage 201, in correlation with the identifier (ID) of that electronic control apparatus. In these storage locations, the initial value is set to be "0".

In this process, the master control apparatus 130 retrieves the master data from the master data storage 201. Then, the master control apparatus 130 sends the response request to all of the electronic control apparatuses, which are registered in the retrieved master data. Then, for those responded electronic control apparatuses, from which the connection information is obtained, the master control apparatus 130 sets the result of the response request of each of these responded control apparatuses (identified with the corresponding identifier) as "1", as shown in FIGS. 21B-21D. This is performed sequentially according to a responding order of these responded electronic control apparatuses.

Then, upon execution of this process, as shown in FIG. 21D, when the connection information of the electronic control apparatuses connected to the on-vehicle network CN is obtained, the master control apparatus 130 determines the work load share of the vehicle 100 side and the work load share of the control center 200 side at step S322.

Next, the process of step S322 (the work load share determination process at the vehicle 100 side) will be described more specifically with reference to FIG. 22.

Figure 22:
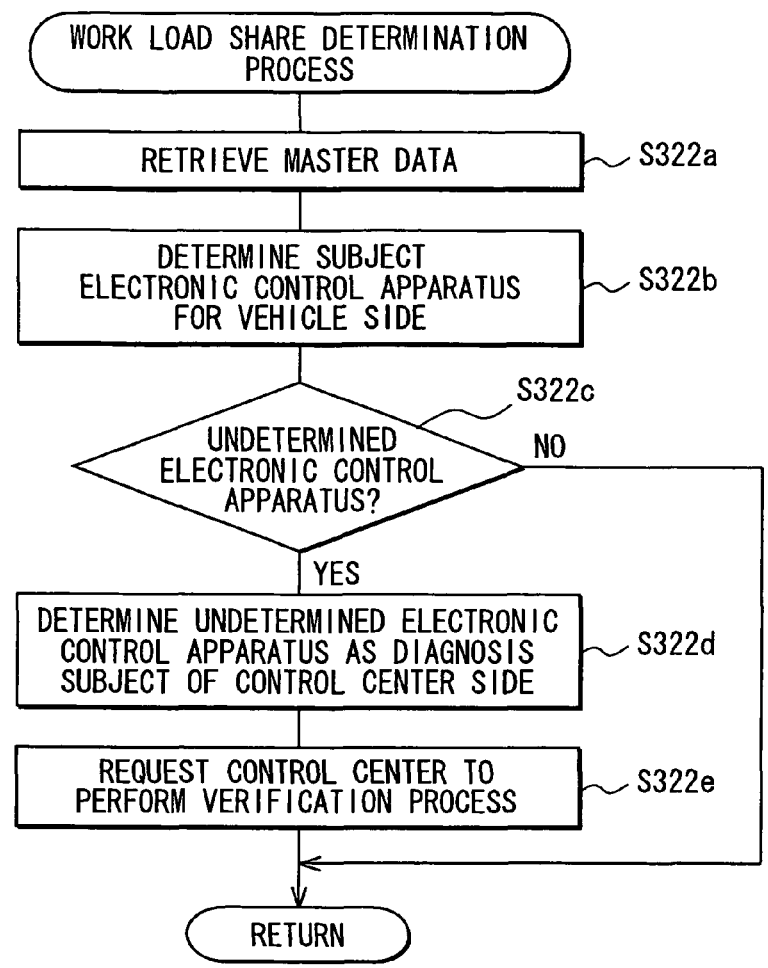
FIG. 22 is a flowchart showing a procedure for determining a work load share of the communication control apparatus (the on-vehicle control apparatus) and a work load share of the control center in the master control apparatus (the on-vehicle control apparatus) of the vehicle.

As shown in FIG. 22, at the time of work load share determination process in the vehicle 100 side, the master control apparatus 130 first retrieves the master data from the master data storage 201 at step S322a. Then, at step S322b, the subject electronic control apparatuses, which are the subjects to be diagnosed at the vehicle 100 side, are determined from the registered electronic control apparatuses, which are registered in the retrieved master data. Similar to the first embodiment, in the present embodiment, the subject electronic control apparatuses are determined depending on the current processing load (e.g., a computation load, a communication load) of the master control apparatus 130. When the diagnosis subjects of the vehicle 100 side are determined in this way, the master control apparatus 130 determines whether all of the electronic control apparatuses registered in the master data are assigned as the diagnosis subjects of the vehicle 100 side at step S322c. Then, when it is determined that all of the electronic control apparatuses are assigned to the vehicle 100 side as its diagnosis subjects at step S322c, the master control apparatus 130 terminates the current control operation without requesting the above verification process to the control center 200. That is, in such an instance, the diagnosis operation for diagnosing the validity of the connecting states of all of the electronic control apparatuses connected to the on-vehicle network CN is entirely performed by the master control apparatus 130 of the vehicle 100.

In contrast, when the result of the determination at step S322c indicates that an unassigned, i.e., undetermined electronic control apparatus(es) still exists, control proceeds to step S322d. At step S322d, the unassigned electronic control apparatus(es) is determined as the diagnosis subject(s) of the control center 200 side. Thereafter, at step S322e, the master control apparatus 130 requests the control center 200 to diagnose the assigned diagnosis subjects of the control center 200. Through the above operation, the diagnosis operation of the control center 200 is performed in parallel with the diagnosis operation of the vehicle 100 side.

Here, it should be noted that depending on the processing load of the master control apparatus 130, the diagnosis operation for diagnosing the validity of the connecting states of all of the electronic control apparatuses connected to the on-vehicle network CN could be entirely assigned to the control center 200 in the work load share determination process at step S322. Thus, in the master control apparatus 130 of the present embodiment, after the work load share determination process at step S322, as shown in FIG. 19, it is determined whether the electronic control apparatus(es) assigned as the diagnosis subject(s) of the vehicle 100 side exists at step S323. When it is determined that the electronic control apparatus(es) assigned as the diagnosis subject(s) of the vehicle 100 side exists at step S323, control proceeds to step S324. At step S324, the master control apparatus 130 verifies the connection information, which is obtained by sending the response request to each subject electronic control apparatus, with the master data. At the time of performing the verification process at the vehicle 100 side (step S324), the master data and the connection information are first retrieved, like in the first embodiment. Then, the connection information is verified with the master data, and the verification result is stored in the memory in the master control apparatus 130.

In contrast, when it is determined that the electronic control apparatus(es) assigned as the diagnosis subject(s) of the vehicle 100 side does not exist at step S323, the verification process for diagnosing the validity of the connecting states of the electronic control apparatuses connected to the on-vehicle network CN is entirely performed in the control center 200.

Thereafter, at step S325, the electronic control apparatuses registered in the master data are compared with the subject electronic control apparatuses, which are assigned as the diagnosis subjects of the vehicle 100 side, and it is determined whether the diagnosis subject(s) of the control center 200 exists. When it is determined that the diagnosis subject(s) of the control center 200 side exits at step S325, control proceeds to step S326. At step S326, the result of the verification process performed at the control center 200 side is received. Then, based on the result of the verification process of the control center 200 side and the result of the verification process of the vehicle 100 side, it is determined whether an error exits in the results of these verification processes at step S327. When it is determined that the diagnosis subject(s) of the control center 200 does not exist, it is determined whether there is an error in the result of the verification process executed in the vehicle 100 side at step S327. Then, when it is determined that the error does not exist at step S327, control proceeds to step S328. At step S328, the verification process flag is reset, i.e., is cleared, and the current control operation is terminated.

In contrast, when it is determined that there is the error in the result of the verification process at step S327, control proceeds to step S331 before the manipulation of the verification process flag (step S328). At step S331, the electronic control apparatus(es), which is diagnosed as having the invalid connecting state, is identified. Then, based on the master data, which is stored in the master data storage 201, the master control apparatus 130 sends a request for storing the above diagnosis information in the respective registered electronic control apparatuses, which are registered as the storage locations for storing the above diagnosis information. In this way, the diagnosis information is stored in the respective corresponding electronic control apparatuses, and the predetermined fail-safe measure previously set for that particular diagnosis information is executed (a fail-safe processing means). It is practically desirable that the master control apparatus 130 notifies the control center 200 that the verification error has occurred at step S331.

Next, the diagnosis process performed in the control center 200 side will be described with reference to FIGS. 23-24. The control center 200 of the present embodiment performs the diagnosis process based on the verification request from the vehicle 100.

At the time of performing the diagnosis process in the control center 200, the control center 200 performs a verification process (see FIG. 23) for verifying the connection information obtained by the vehicle 100 side with the master data and also at the same time performs a flag manipulation process (see FIG. 24) for manipulating the flag used in the verification process. These processes are also repeated at predetermined intervals.

Figure 24:
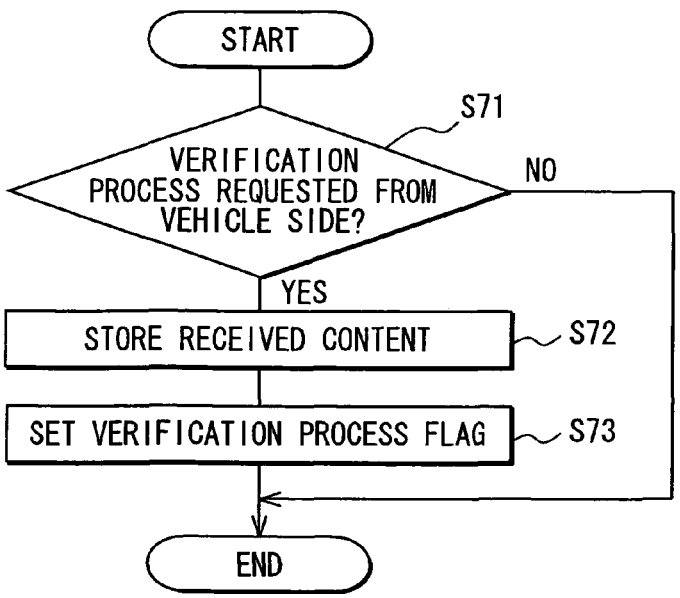
FIG. 24 is a flowchart showing a procedure for manipulating a verification process flag in the control center.

At the time of executing the flag manipulation process, as shown in FIG. 24, the control center 200 will wait until a verification process execution request is received from the vehicle 100 side at step S71. When the verification process execution request is received from the vehicle 100, the content of this request (the result of the work load share determination process executed at the vehicle 100 side) is stored in the predetermined memory of the control center 200 at step S72. Then, at step S73, a verification process flag, which indicates a need for performing the verification process, is set, and the current control operation is terminated. Through the above processes, in the control center 200, the content of the verification process execution request stored in the above memory is executed, i.e., the connection information obtained in the vehicle 100 side is verified with the master data according to the work load share of the control center 200 side, which is determined at the vehicle 100 side. The flags manipulated at the control center 200 are stored in the memory in the control center 200.

Figure 23:
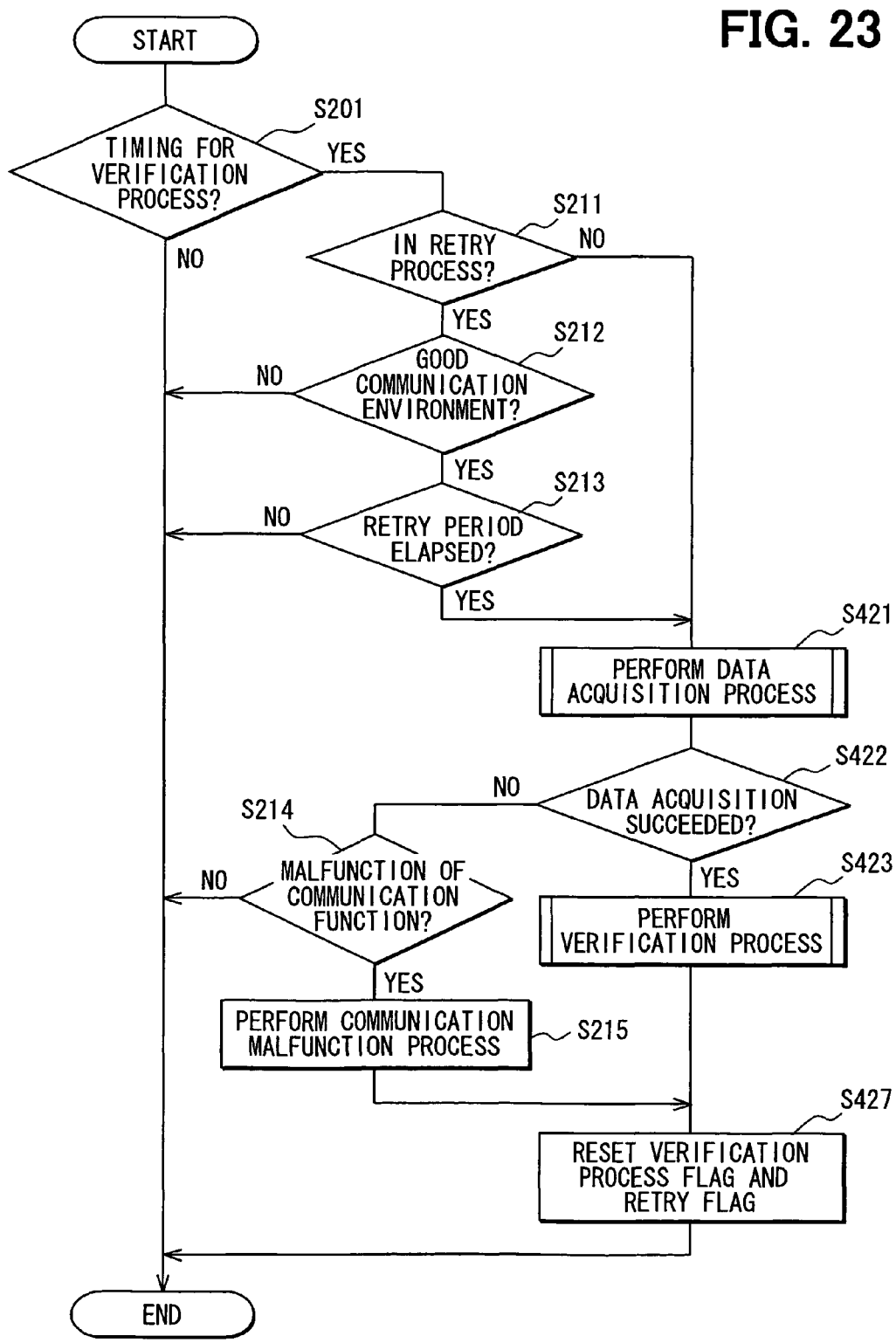
FIG. 23 is a flowchart showing a procedure for verifying connection information obtained at the vehicle side with the master data in the control center.

Then, in the control center 200, as described above, the verification process for verifying the connection information obtained by the vehicle 100 side with the master data is performed according to the flowchart shown in FIG. 23 in parallel with the above flag manipulation process (FIG. 24).

That is, as shown in FIG. 23, at step S201, the control center 200 of the present embodiment will wait until the verification process flag is set. When it is determined that the verification process flag is set, it is then determined that the verification process needs to be performed, so that control proceeds to step S211. At step S211, a flag state of a retry flag, which indicates that control needs to proceed to a retry process for retrying information exchange relative to the vehicle 100, is checked. Similar to the first embodiment (FIG. 11), when it is determined that the retry flag is set, the retry process (steps S213, S214) for reacquiring the information transmitted from the vehicle 100 side through the radio communication is executed.

When it is determined that the retry flag is reset, i.e., cleared at step S211, the control center 200 performs acquisition (a data acquisition process) of the corresponding information, which is required to perform the verification process at the control center 200 side, from the master control apparatus 130 of the vehicle 100 through the radio communication at step S421. In this embodiment, this process is performed through the procedure similar to the data acquisition process (FIG. 14) of the control center 200 side described in the first embodiment. Here, in addition to the connection information obtained at the vehicle 100 side, the control center 200 requests the master control apparatus 130 of the vehicle 100 to transmit the master data stored in the master data storage 201 of the master control apparatus 130.

After the data acquisition process, it is determined whether the master data and the connection information are appropriately received from the master control apparatus 130 of the vehicle 100 at step S422. When the reception of the master data and the connection information from the master control apparatus 130 of the vehicle 100 fails, the control center 200 executes steps S214, S215 like in the first embodiment (FIG. 11).

In contrast, when it is determined that the master data and the connection information are appropriately received from the master control apparatus 130 and are stored in, for example, the memory of the control center 200 at step S422, control proceeds to step S423. At step S423, the connection information is verified with the received master data according to the result of the work load share determination process performed at the vehicle 100 side. Specifically, this is performed according to the procedure, which is substantially the same as that of the verification process (FIG. 15) of the first embodiment.

After the execution of the verification process, control proceeds to step S427. At step S427, the verification process flag and the retry flag are reset, i.e., cleared, and the current control operation is terminated.

As described above, after the execution of the verification process (FIG. 23) at the control center 200 side, the master control apparatus 130 of the vehicle 100 receives the result of the verification process performed at the control center 200. Then, the result of the verification process of the control center 200 side and the result of the verification process of the vehicle 100 side are integrated, so that the diagnosis results of all of the electronic control apparatuses connected to the on-vehicle network CN are integrally managed. When it is determined that a verification error exists in the connection information obtained through the response request in view of the master data, the predetermined corresponding fail-safe measure is executed in the respective electronic control apparatuses in the vehicle 100. Furthermore, a notification, which indicates the presence of the verification error (the verification result) is transmitted to the control center 200.

As described above, the on-vehicle network diagnosis system and the on-vehicle control apparatus used therein also provide the advantages similar to those described in the above sections (1), (2), (5), (6), (8), (9) and (11) of the first embodiment. Furthermore, the following advantage is additionally achieved according to the second embodiment.

(12) The connection information of the electronic control apparatuses in the vehicle 100 is obtained through the execution of the response request, which is outputted from the master control apparatus 130 to all of the other electronic control apparatuses in the vehicle 100. Thus, the verification of the connection information with the master data can be integrally performed, so that the result of the diagnosis can be more easily and effectively obtained. Furthermore, in the control center 200, the connection information can be integrally received from the vehicle 100, so that the reception of the connection information is eased.

Modifications

The above embodiments can be modified as follows.

Figure 25:
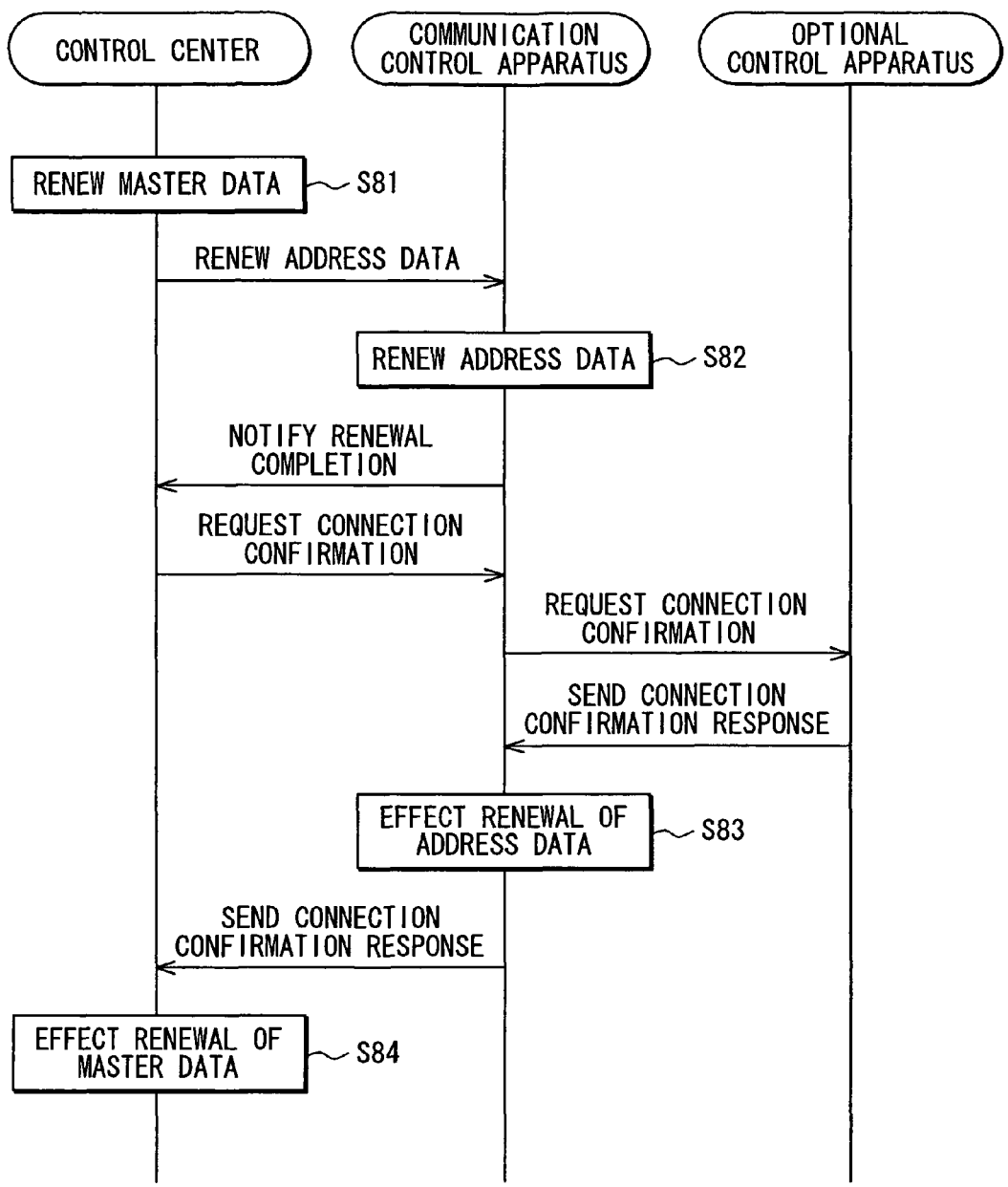
FIG. 25 is a sequence chart showing a procedure for automatically renewing master data.

In the first embodiment, when a new electronic control apparatus, which is not listed on the master data, is connected to the on-vehicle network CN, the vehicle 100 side communication control apparatus 30 obtains the connection information of the new control apparatus from the new control apparatus through the on-vehicle network CN. Then, the obtained connection information of the new electronic control apparatus is transferred to the control center 200, and then the master data stored in the master data storage 201 is renewed. However, the above system, in which the connection information of the new electronic control apparatus that is not listed on the master data is supplied to the control center 200 upon connection of the new electronic control apparatus to the on-vehicle network CN, may be modified in a manner shown in FIG. 25 to change the way of renewing the master data. Specifically, in this modified system, when the connection information of the new electronic control apparatus is supplied to the control center 200, the control center 200 renews the master data of the master data storage 201 by adding the connection information of the new control apparatus to the master data at step S81. Then, the control center 200 sends a request to the communication control apparatus 30 of the vehicle 100 to renew the address data stored in the communication control apparatus 30. In response to this request, the communication control apparatus 30 of the vehicle 100 renews the address data stored in the communication control apparatus 30 based on the connection information of the new electronic control apparatus, which is transmitted along with the content of the request from the control center 200. Then, a completion notification, which indicates the completion of the renewal process of the address data, is transmitted from the communication control apparatus 30 of the vehicle 100 to the control center 200. In response to the completion notification of the renewal process of the address data, the control center 200 sends a connection confirmation request to the new electronic control apparatus of the vehicle 100 through the communication control apparatus 30 of the vehicle 100. In response to this, the new electronic control apparatus sends a connection confirmation response, which indicates the confirmation of the connection, to the communication control apparatus 30 through the on-vehicle network CN of the vehicle 100. Then, the communication control apparatus 30 transfers the connection confirmation response of the new electronic control apparatus to the control center 200. In this way, upon satisfaction of the condition of that the connection confirmation response of the new electronic control apparatus is valid, the renewal of the address data stored in the communication control apparatus 30 of the vehicle 100 and the renewal of the master data stored in the master data storage 201 of the control center 200 are respectively effected (steps S83, S84).

Furthermore, in the second embodiment, the renewal of the master data may be performed in a manner similar to that of the first embodiment. However, in this instance, the renewal of the master data should be performed by the master control apparatus 130 of the vehicle 100, which has the master data storage 201.

Furthermore, in the second embodiment, the control center 200 may send the verification process execution request to the vehicle 100 side.

Furthermore, in the second embodiment, the control center 200 may perform the work load share determination process for determining the work load share of the communication control apparatus 30 and the work load share of the control center 200. In this instance, the control center 200 obtains the master data from the vehicle 100 side at the time of performing the work load share determination process.

Furthermore, in the above embodiments, the work load share of the vehicle 100 side and the work load share of the control center 200 side may be determined based on both of the current processing load of the vehicle 100 side and the current processing load of the control center 200 side. In this instance, at the time of performing the work load share determination process in one of the vehicle 100 side and the control center 200 side, the one of the vehicle 100 side and the control center 200 side will receive the current processing load of the other one of the vehicle 100 side and the control center 200 side.

Furthermore, in the work load share determination process (step S131 or step S231) of the first embodiment, all of the registered electronic control apparatuses, which are registered in the above address data, may be predetermined as the diagnosis subjects of the vehicle 100 side, and the other electronic control apparatuses other than the registered electronic control apparatuses may be predetermined as the diagnosis subjects of the control center 200 side. Also, in the work load share determination process of the second embodiment, the work load share of the vehicle 100 side and the work load share of the control center 200 side may be predetermined.

Furthermore, in the first embodiment, the connection information, which is obtained at the vehicle 100 side, is verified with the address data of the communication control apparatus 30 of the vehicle 100 in the verification process, which is performed in the vehicle 100 side. Alternatively, in this verification process, the communication control apparatus 30 of the vehicle 100 may receive the master data from the control center 200 side and may verify the connection information, which is obtained at the vehicle 100 side, with the master data received from the control center 200 side. In this instance, in the work load share determination process, which is performed in either of the vehicle 100 side and the control center 200 side, it may not be necessary to determine only the registered electronic control apparatuses, which are registered in the address data of the communication control apparatus 30, as the diagnosis subjects of the vehicle 100 side.

In the case where the information, which is required at the time of diagnosing the connection abnormality of the on-vehicle network CN, is obtained by the vehicle 100 side from the control center 200 side, it is desirable that the above retry process is also performed in the vehicle 100 side. In the case where the above retry process is performed in the vehicle 100 side, it is desirable that the determination process (step S212), which determines whether the communication environment is good, is performed through the navigation control apparatus 40.

In the above retry process, in the case where the communication between the vehicle 100 side and the control center 200 side is re-executed based on the determination of the abnormality of the communication function between the vehicle 100 side and the control center 200 side, the way of performing this process can be any appropriate one. Furthermore, in some cases, the above retry process may not be performed.

Furthermore, the master data storage 201 may be provided in each of the vehicle 100 side and the control center 200 side.

Furthermore, the master data may be one, in which all of the electronic control apparatuses connected to the on-vehicle network CN are registered as the storage locations for storing the diagnosis information of the identified invalid electronic control apparatus, which has the invalid connecting state relative to the on-vehicle network CN. That is, in this instance, when all of the electronic control apparatuses connected to the on-vehicle network CN identify the invalid electronic control apparatus, the service described in the above section (III) can be provided.

Furthermore, in some cases, the master data may not store the storage locations, which store the diagnosis information of the identified invalid electronic control apparatus. In the case where the master data does not store the storage locations for storing the diagnosis information of the identified invalid electronic control apparatus, it is possible to use a system that automatically stores the diagnosis information of the invalid electronic control apparatus in all of the electronic control apparatuses connected to the on-vehicle network CN when the invalid electronic control apparatus is diagnosed as invalid. In this way, the service described in the above section (III) can be provided.

In the first embodiment, the control center 200 includes the diagnosis information processing means. When the electronic control apparatus, which has the invalid connecting state relative to the on-vehicle network CN, is identified, the diagnosis information processing means stores the identifier of the identified electronic control apparatus and the diagnosis information of the identified electronic control apparatus in the storage means of the vehicle 100 (steps S227 and S232). In contrast, in the second embodiment, the diagnosis information processing means is provided in the vehicle 100 (steps S327 and S331). Alternatively, the diagnosis information processing means may be provided in both of the vehicle 100 and the control center 200. Specifically, in such an instance, the result of the verification process executed in the vehicle 100 may be handled by the diagnosis information processing means of the vehicle 100, and the result of the verification process executed in the control center 200 may be handled by the diagnosis information processing means of the control center 200.

In each of the above embodiments, the information, which is required in the verification process and is transmitted through the radio communication between the vehicle 100 and the control center 200, is varied according to the work load share of the vehicle 100 side and the work load share of the control center 200 side. However, in some cases, such information may not be varied.

In the above embodiments, the diagnosis process, which diagnoses the validity of the connecting state of the respective electronic control apparatuses of the vehicle 100 relative to the on-vehicle network CN based on the master data and the connection information obtained in the vehicle 100, is performed by sharing the work load between the vehicle 100 side and the control center 200 side. Alternatively, this diagnosis process may be performed by only one of the vehicle 100 side and the control center 200 side. The diagnosis process may be performed in the following manner.

(o) In the case where the master data storage 201 is provided in the control center 200, and the connection information obtained at the vehicle 100 side is transmitted to the control center 200 through the radio communication, the diagnosing of the validity of the connecting state of the electronic control apparatuses of the vehicle 100 relative to the on-vehicle network CN may be performed at the control center 200 side based on the master data, which is stored in the master data storage 201, and the connection information, which is transmitted from the vehicle 100 side. Then, the result of this diagnosing may be stored in the control center 200 side.

(p) In the case where the master data storage 201 is provided in the vehicle 100, and master data stored in the master data storage 201 and the connection information obtained at the vehicle 100 side are transmitted to the control center 200 through the radio communication, the diagnosing of the validity of the connecting state of the electronic control apparatuses of the vehicle 100 relative to the on-vehicle network CN may be performed at the control center 200 side based on the transmitted master data and the connection information obtained at the vehicle 100 side. Then, the result of this diagnosing may be stored in the control center 200 side.

(q) In the case where the master data storage 201 is provided in the control center 200, and master data stored in the master data storage 201 is transmitted to the vehicle 100 through the radio communication, the diagnosing of the validity of the connecting state of the electronic control apparatuses of the vehicle 100 relative to the on-vehicle network CN may be performed at the vehicle 100 side based on the transmitted master data and the connection information obtained at the vehicle 100 side. Then, the result of this diagnosing may be transmitted to the control center 200 through the radio communication.

(r) In the case where the master data storage 201 is provided in the vehicle 100, the diagnosing of the validity of the connecting state of the electronic control apparatuses of the vehicle 100 relative to the on-vehicle network CN may be performed at the vehicle 100 side based on the master data stored in the master data storage 201 and the connection information obtained by the vehicle 100. Then, the result of this diagnosing may be transmitted to the control center 200 through the radio communication.

(s) In the case where the diagnosing of the validity of the connecting state of the electronic control apparatuses of the vehicle 100 relative to the on-vehicle network CN is executable at both of the vehicle 100 side and the control center 200 side based on the master data and the connection information obtained by the vehicle 100, the diagnosing of the validity of the connecting state of the electronic control apparatus of the vehicle 100 may be executed based on a request transmitted from one of the vehicle 100 and the control center 200 to the other one of the vehicle 100 and the control center 200. Furthermore, at the time of performing the above diagnosing, the information, which is required in the verification process, and the result of the diagnosing may be transmitted between the vehicle 100 and the control center 200 through the radio communication.

(t) In the case where the diagnosing of the validity of the connecting state of the electronic control apparatuses of the vehicle 100 relative to the on-vehicle network CN is executable at both of the vehicle 100 side and the control center 200 side based on the master data and the connection information obtained by the vehicle 100, the start timing of the diagnosing of the validity of the connecting state of the electronic control apparatus of the vehicle 100 may be determined based on a request transmitted from one of the vehicle 100 and the control center 200 to the other one of the vehicle 100 and the control center 200. Furthermore, at the time of performing the above diagnosing, the information, which is required in the verification process, and the result of the diagnosing may be transmitted between the vehicle 100 and the control center 200 through the radio communication.

As described above in the sections (o) to (t), the information is transmitted between the vehicle 100 and the control center 200 through the radio communication. Therefore, in the case where the master data storage 201 is provided in any one of the vehicle 100 and the control center 200 or in the case where the diagnosing is executed in any one of the vehicle 100 and the control center 200, the information, which is required in the verification process, is appropriately transmitted between the vehicle 100 and the control center 200 to achieve the objective of the present invention.

It may be only required that the master data storage 201 is provided in at least one of the vehicle 100 and the control center 200, and the connection information obtained by the vehicle 100 side is verified with the master data to perform the above diagnosing, and the result of the diagnosing is managed in the control center 200 side.

It may be only required that the master data is the connection information, into which the vehicle specific installation details with respect to the electronic control apparatuses connected to the on-vehicle network CN that forms the distributed control system of the vehicle 100, are directly reflected. In this sense, it may not be required to store the identifier of each corresponding electronic control apparatus in the master data storage 201 in correlation with the vehicle identification code such that the connection position of each corresponding electronic control apparatus, which is hierachized or grouped in a manner that corresponds to the network structure, is included in the master data.

The first and second gateway control apparatuses may be formed by a dedicated hardware circuit as long as it allows the communication of the data on the network between different network arrangements that use different media and/or the protocols, by appropriately converting the data in a manner that allows the communication of the data between the different systems.

The communication protocol used in the on-vehicle network CN is not limited to the CAN protocol and can be any other appropriate communication protocol, such as FlexRay protocol.

Also, it may not be required to diagnose the validity of the connecting states of the electronic control apparatuses relative to the on-vehicle network with respect to the distributed control system in each of the vehicles. Furthermore, it may not be required to manage the result of the diagnosing of each of the vehicles at the control center side. That is, as long as the connection information of the respective electronic control apparatuses of the vehicle, which is obtained according to the execution of the response request in the corresponding electronic control apparatus, is verified with the master data, at least the advantage similar to the one described in the above section (1) of the first embodiment can be achieved.

Additional advantages and modifications will readily occur to those skilled in the art. The invention in its broader terms is therefore not limited to the specific details, representative apparatus, and illustrative examples shown and described.

What is claimed is:

1. An on-vehicle control apparatus that communicates with a remote control center and is connected to an on-vehicle network, to which a plurality of electronic control apparatuses are connected and which performs distributed control of a plurality of on-vehicle devices, the on-vehicle control apparatus comprising:
   a communicating means for communicating information with the control center through radio communication;
   a connection information obtaining means for obtaining current connection information of the plurality of electronic control apparatuses with respect to the on-vehicle network based on a response, which is transmitted from the plurality of electronic control apparatuses in reply to a response request outputted from the connection information obtaining means to the plurality of electronic control apparatuses; and
   a vehicle-side diagnosing means for diagnosing the plurality of electronic control apparatuses in view of the obtained current connection information of each replying one of the plurality of electronic control apparatuses, wherein:
   at least one of the on-vehicle control apparatus and the control center includes a master data storage means for storing master data, which includes reference connection information of the plurality of electronic control apparatuses with respect to the on-vehicle network;
   the reference connection information of the plurality of electronic control apparatuses includes connection position information and identification information of each of the plurality of electronic control apparatuses in the on-vehicle network;
   the current connection information of each replying one of the plurality of electronic control apparatuses includes connection position information and identification information of the electronic control apparatus;
   the control center includes a control center-side diagnosing means for diagnosing the plurality of electronic control apparatuses in view of the current connection information of each replying one of the plurality of electronic control apparatuses; and
   the vehicle-side diagnosing means and the control center-side diagnosing means diagnose validity of a connecting state of the plurality of electronic control apparatuses relative to the on-vehicle network by comparing the current connection information of each replying one of the plurality of electronic control apparatuses with the master data and thereby determining whether the current connection information of each replying one of the plurality of electronic control apparatuses matches with the master data in such a manner that the vehicle-side diagnosing means and the control center-side diagnosing means communicate information required in diagnosing the validity of the connecting state of the plurality of electronic control apparatuses through radio communication therebetween and share a work load of the diagnosing of the validity of the connecting state of the plurality of electronic control apparatuses therebetween,
   a work load share of the vehicle-side diagnosing means and a work load share of the control center-side diagnosing means in the diagnosing of the validity of the connecting state of the plurality of electronic control apparatuses being determined based on a current processing load of at least one of the on-vehicle control apparatus and the control center.

2. The on-vehicle control apparatus according to claim 1, wherein the information, which is communicated between the vehicle-side diagnosing means and the control center-side diagnosing means through the radio communication and is required in the diagnosing of the validity of the connecting state of the plurality of electronic control apparatuses, is variable depending on a work load share of the vehicle-side diagnosing means and a work load share of the control center-side diagnosing means in the diagnosing of the validity of the connecting state of the plurality of electronic control apparatuses.

3. The on-vehicle control apparatus according to claim 1, wherein:
   the master data storage means is provided only in the control center;
   a work load share of the vehicle-side diagnosing means and a work load share of the control center-side diagnosing means in the diagnosing of the validity of the connecting state of the plurality of electronic control apparatuses are determined based on address data, which is prestored in the on-vehicle control apparatus as connection information used in the distributed control performed through the on-vehicle network; and
   when the vehicle-side diagnosing means processes the work load share of the vehicle-side diagnosing means, the vehicle-side diagnosing means uses the address data as the master data, so that the vehicle-side diagnosing means compares the current connection information of each replying one of the plurality of electronic control apparatuses with the address data and thereby determines whether the current connection information of each replying one of the plurality of electronic control apparatuses matches with the address data.

* * * * *